(12) United States Patent
Tulapurkar et al.

(10) Patent No.: US 9,863,342 B2
(45) Date of Patent: Jan. 9, 2018

(54) SYSTEM AND METHOD FOR CONTROLLING AN ENGINE AIR-FUEL RATIO

(71) Applicant: General Electric Company, Schenectady, NY (US)

(72) Inventors: Chetan Sharadchandra Tulapurkar, Bangalore (IN); Manoj Gokhale, Bangalore (IN); Roy James Primus, Niskayuna, NY (US); Leslie Orin Trask, McKean, PA (US); James Robert Mischler, Girard, PA (US); Adam Edgar Klingbeil, Ballston Lake, NY (US); Thomas Michael Lavertu, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 14/864,984

(22) Filed: Sep. 25, 2015

(65) Prior Publication Data

US 2017/0089278 A1 Mar. 30, 2017

(51) Int. Cl.
*F02D 41/00* (2006.01)
*F02B 37/16* (2006.01)
(Continued)

(52) U.S. Cl.
CPC .......... *F02D 41/0027* (2013.01); *B61C 15/12* (2013.01); *F02B 37/16* (2013.01); *F02B 43/10* (2013.01); *F02D 19/0647* (2013.01); *F02D 19/081* (2013.01); *F02D 35/027* (2013.01); *F02D 41/0025* (2013.01); *F02D 41/021* (2013.01); *F02D 41/1456* (2013.01); *F02B 63/04* (2013.01); *F02B 2043/103* (2013.01); (Continued)

(58) Field of Classification Search
CPC ............ F02D 41/0027; F02D 41/1497; F02D 41/0007; F02B 37/16; F02B 43/10; F02B 2043/103
See application file for complete search history.

(56) References Cited

U.S. PATENT DOCUMENTS 6,947,830 B1 * 9/2005 Froloff .................. F02D 35/023
701/111
2007/0215101 A1 * 9/2007 Russell ................... F02P 15/02
123/310

(Continued)

FOREIGN PATENT DOCUMENTS

JP 2007040165 A 2/2007
WO 200602958 A1 3/2006

*Primary Examiner* — Joseph Dallo
(74) *Attorney, Agent, or Firm* — Global Patent Operation; John A. Kramer

(57) ABSTRACT

Various methods and systems are provided for adjusting an air-fuel ratio for combustion in an engine. In one embodiment, a method for an engine (e.g., a method for controlling an engine system) comprises responding to a sensed change in a load on the engine, or indications of engine knock or misfire, by one or more of: altering a speed of the engine, adjusting a fueling flow rate into at least one cylinder of the engine, and adjusting a position of a valve in a bypass passage configured to direct compressed intake air away from cylinders of the engine to obtain a determined air-fuel ratio; and thereby maintaining an air-fuel ratio in a determined range.

20 Claims, 8 Drawing Sheets

(51) Int. Cl.
   *F02B 43/10*  (2006.01)
   *B61C 15/12*  (2006.01)
   *F02D 41/02*  (2006.01)
   *F02D 41/14*  (2006.01)
   *F02D 19/06*  (2006.01)
   *F02D 19/08*  (2006.01)
   *F02D 31/00*  (2006.01)
   *F02D 35/02*  (2006.01)
   *F02B 63/04*  (2006.01)

(52) U.S. Cl.
   CPC .......... *F02D 31/001* (2013.01); *F02D 35/023* (2013.01); *F02D 41/0007* (2013.01); *F02D 41/023* (2013.01); *F02D 41/1475* (2013.01); *F02D 2200/1015* (2013.01); *F02D 2200/50* (2013.01)

(56) References Cited

U.S. PATENT DOCUMENTS

| | | | | |
|---|---|---|---|---|
| 2007/0215104 A1* | 9/2007 | Hahn | .................... | F02D 35/021 123/339.11 |
| 2007/0215111 A1* | 9/2007 | Surnilla | ................ | F02D 19/088 123/431 |
| 2007/0215130 A1* | 9/2007 | Shelby | .................. | F02D 19/084 123/637 |
| 2007/0235009 A1* | 10/2007 | Nakashima | ........... | F02D 41/047 123/458 |
| 2008/0288158 A1* | 11/2008 | Leone | .................. | F02D 35/027 701/103 |
| 2010/0313849 A1* | 12/2010 | Stoner | .................... | F02D 41/22 123/350 |
| 2012/0028758 A1* | 2/2012 | Stein | ....................... | F02B 47/04 477/115 |
| 2015/0219023 A1* | 8/2015 | Kolhouse | ............. | F02D 19/0642 60/323 |
| 2015/0322848 A1* | 11/2015 | Gokhale | ............. | F01N 13/0097 60/602 |
| 2016/0069287 A1* | 3/2016 | Lavertu | .............. | F02D 41/0025 701/103 |
| 2016/0108873 A1* | 4/2016 | Jackson | ................. | F02M 43/00 123/445 |
| 2016/0169142 A1* | 6/2016 | Klingbeil | ............. | F02D 19/0692 123/435 |
| 2016/0215723 A1* | 7/2016 | Thomas | .............. | F02D 19/0647 |
| 2016/0252027 A1* | 9/2016 | Jackson | ............. | F02D 41/0082 60/605.2 |

* cited by examiner

SYSTEM AND METHOD FOR CONTROLLING AN ENGINE AIR-FUEL RATIO

BACKGROUND

Technical Field

Embodiments of the subject matter disclosed herein relate generally to engines used in vehicles, and more particularly, to a system and method for controlling an air-fuel ratio of an engine.

Discussion of Art

Internal combustion engines rely on precise control of the ratio of air to fuel in order to properly balance emissions and performance characteristics. For example, in a lean-burn diesel engine, if the air-fuel ratio is too low, particulate matter emissions and exhaust temperatures may increase.

Other types of engines, such as a dual fuel engine, also rely on accurate air to fuel ratio control. A dual fuel engine may combust more than one fuel in engine cylinders of the engine. As one example, a dual fuel engine may combust both natural gas and diesel fuel. In a compression ignition (diesel) engine, during a compression stroke, diesel fuel is injected into a cylinder. The diesel fuel combusts and causes any natural gas that is present to burn. There is a region of air to fuel ratio (e.g., referred to herein as air-fuel ratio) for desirable engine operation. For instance, if the cylinder contents are too lean (i.e., too much air), there may be the potential for poor combustion efficiency and/or misfire, and if the cylinder contents are too rich, (i.e., too much fuel), there may be the potential for knock or excessive exhaust temperatures.

Hence, there is a need for an enhanced system and method for controlling an engine such that the air to fuel ratio is within a desired operating region for an associated operating condition.

BRIEF DESCRIPTION

In one embodiment, a method for an engine (e.g., a method for controlling an engine system) comprises responding to a sensed change in a load on the engine, or indications of engine knock or misfire, by one or more of: altering a speed of the engine, adjusting a fueling flow rate into at least one cylinder of the engine, and adjusting a position of a valve in a bypass passage configured to direct compressed intake air away from cylinders of the engine to obtain a determined air-fuel ratio; and thereby maintaining an air-fuel ratio in a determined range.

DETAILED DESCRIPTION

The following description relates to embodiments of adjusting an air-fuel ratio for combustion in an engine. In one embodiment, a method for an engine includes responding to a sensed change in a load on the engine, or indications of engine knock or misfire, by one or more of: altering a speed of the engine, adjusting a fueling flow rate into at least one cylinder of the engine, and adjusting a position of a valve in a bypass passage configured to direct compressed intake air away from cylinders of the engine to obtain a determined air-fuel ratio; and thereby maintaining an air-fuel ratio in a determined range. As one example, the sensed change in load on the engine may be a change in demanded power. As another example, the engine may be a dual fuel engine and adjusting the fueling flow rate may include adjusting a flow rate or amount of a first fuel and/or a second fuel injected into the at least one engine cylinder. As one example, the first fuel may be natural gas and the second fuel may be diesel fuel. Additionally, adjusting the position of the engine bypass valve may include increasing or decreasing an amount of opening of the engine bypass valve, thereby increasing or decreasing, respectively, the amount of airflow diverted away from the engine cylinders. Further, the determined air-fuel ratio may be based on the sensed changed in load or the indication of engine knock or misfire. While we have listed several non-limiting examples here, it will be clear to one skilled in the art that air-fuel ratio may be adjusted based on the sensed change of many other engine parameters including but not limited to engine temperatures, pressures, gaseous emissions, or the like.

Figure 1:
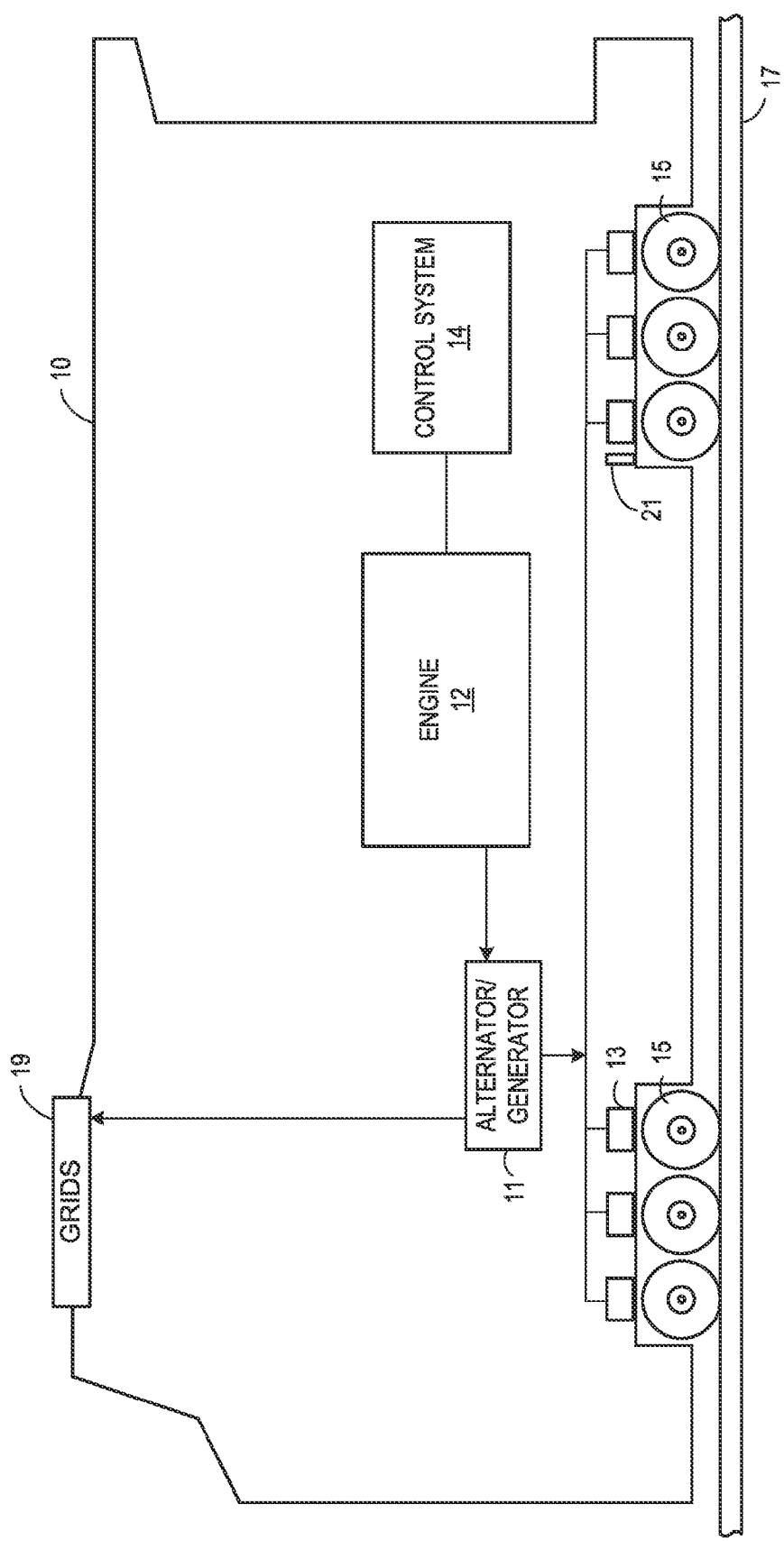
FIG. 1 is a schematic diagrammatical representation of a vehicle, for example, a locomotive moving from a first operating point to a second operating point along a pre-defined path according to an embodiment of the invention.
Figure 2:
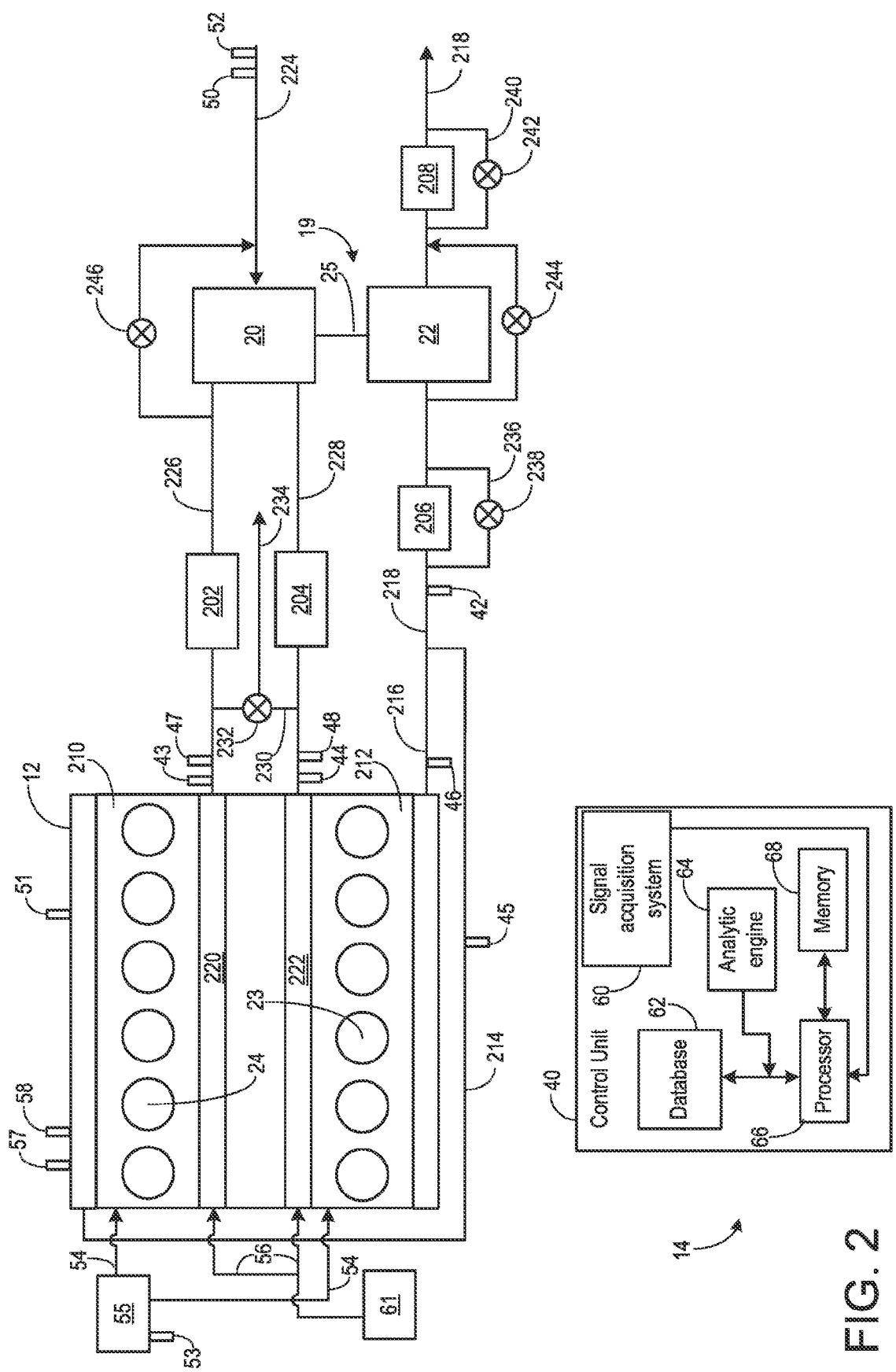
FIG. 2 is a schematic diagrammatical representation of a dual fuel engine according to an embodiment of the invention.
Figure 3:
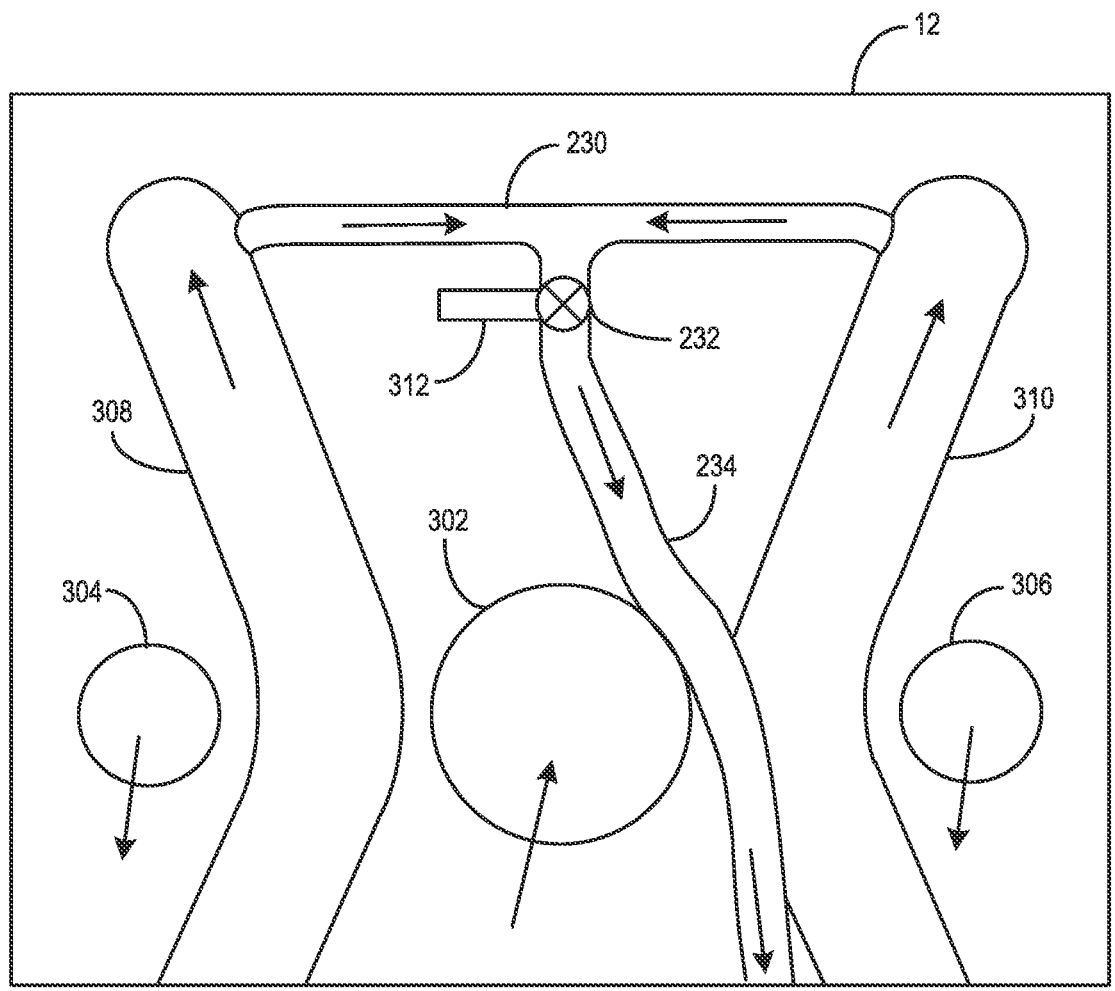
FIG. 3 is a cross-section view of an engine including an engine bypass valve according to an embodiment of the invention.
Figure 4:
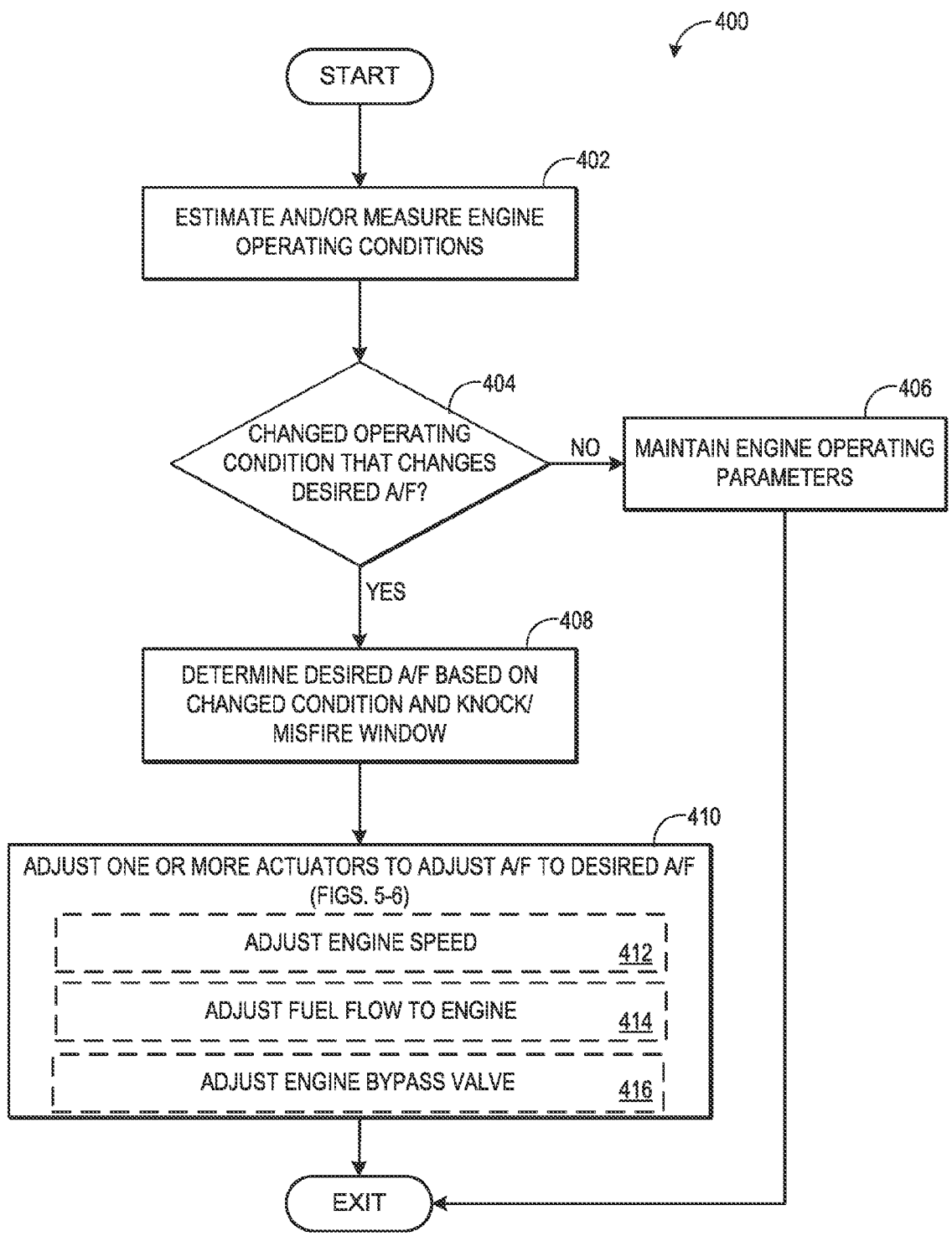
FIG. 4 is a flow chart showing a method for adjusting engine operation to obtain a desired air-fuel ratio in response to a changed operating condition according to an embodiment of the invention.
Figure 5:
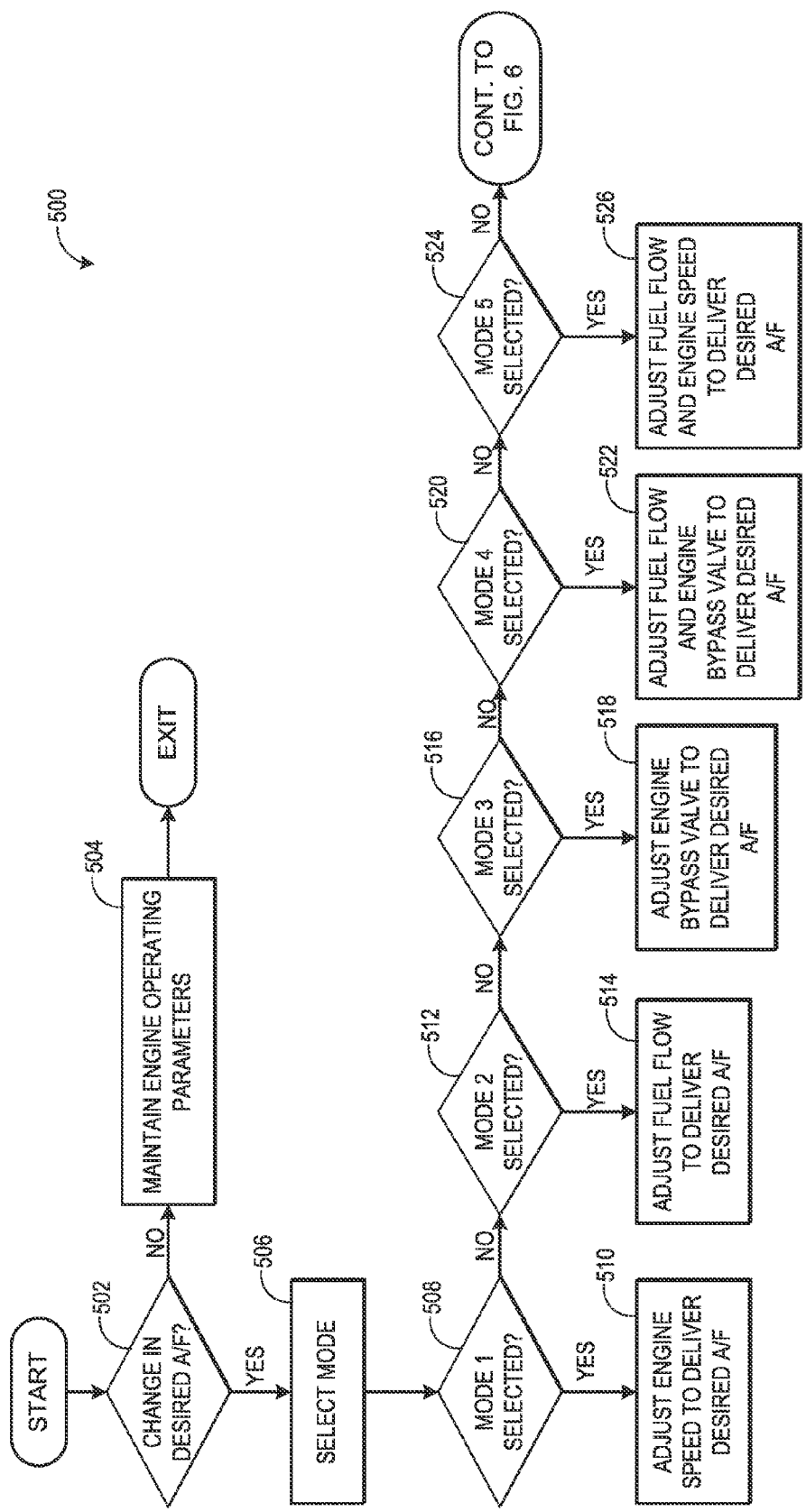
FIGS. 5-6 is a flow chart showing a method for selecting a mode for adjusting the air-fuel ratio into the desired air-fuel ratio determined based on the changed operating condition according to an embodiment of the invention.
Figure 6:
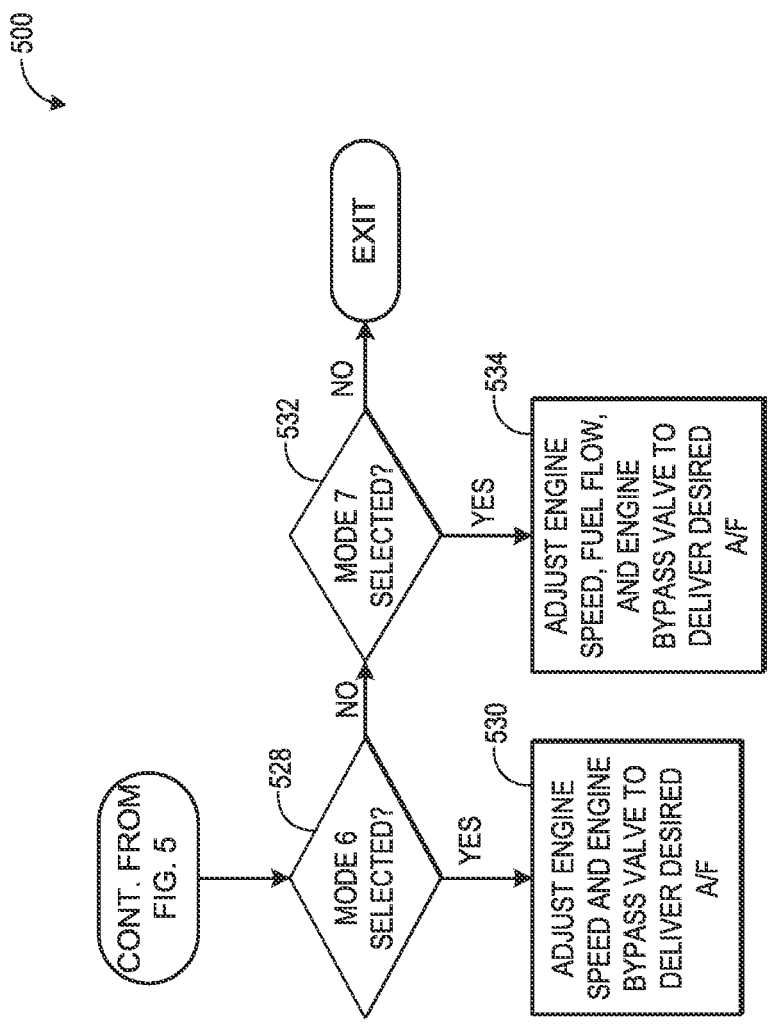
Figure 7:
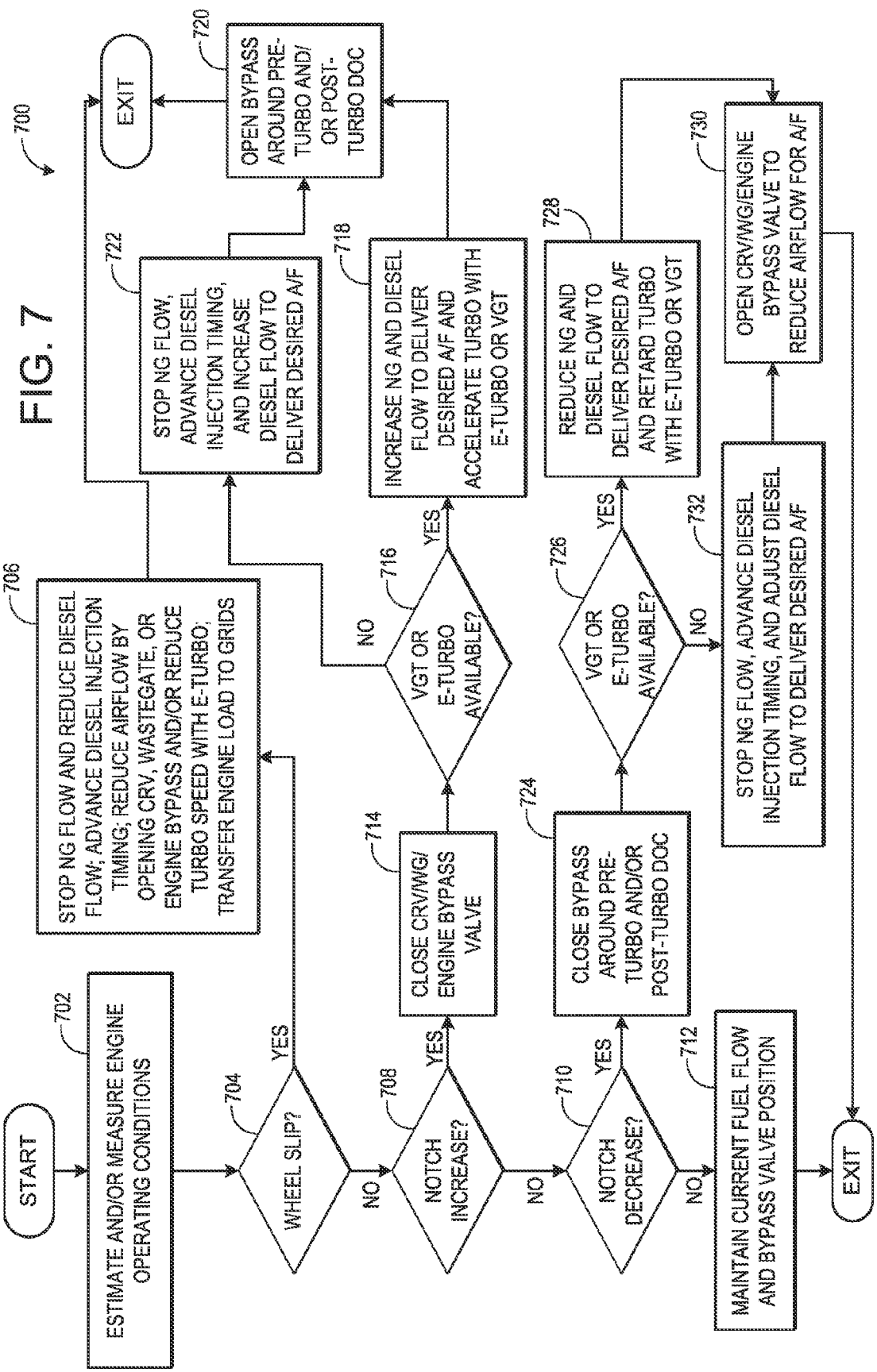
FIG. 7 shows a flow chart showing a method for adjusting multiple engine actuators responsive to transient conditions of an engine in order to adjust an air-fuel ratio for combustion according to an embodiment of the invention.
Figure 8:
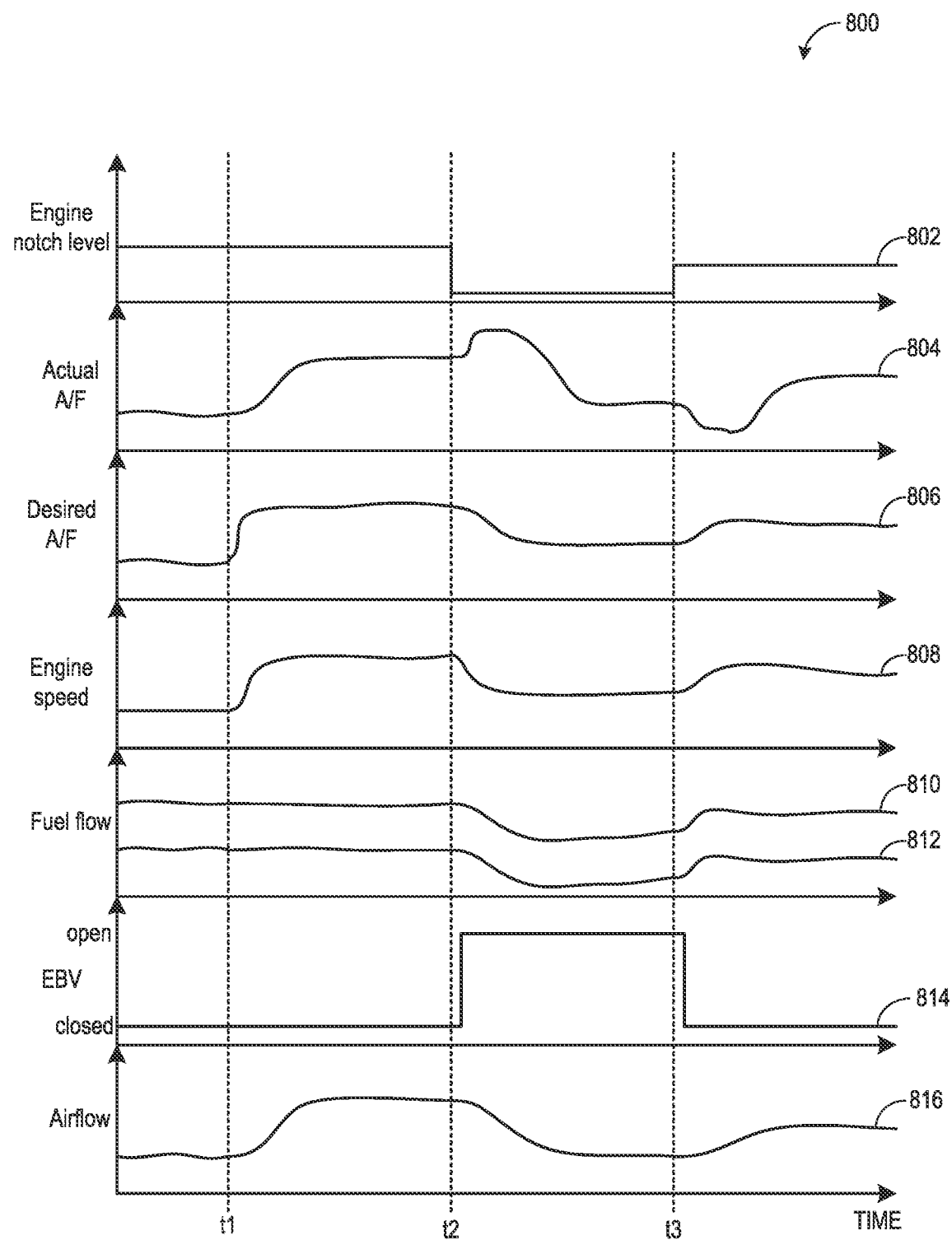
FIG. 8 shows a graph show example adjustments to engine actuators in response to a change in a desired air-fuel ratio for combustion at engine cylinders according to an embodiment of the invention.

FIG. 1 shows an example of a vehicle in which an engine is installed, such as a rail vehicle. An example of the engine, which may be a dual fuel engine, is shown in FIG. 2. Specifically, FIG. 2 shows the engine where two fuels, which may be natural gas and diesel fuel, for example, are used for combustion. An engine controller (such as the control until shown in FIG. 2) may adjust various engine actuators to adjust the amount of air and fuel being combusted at the engine cylinders, and in particular, the ratio of air-to-fuel (e.g., air-fuel ratio) being combusted in the engine cylinder. Engine actuators that may be adjusted to adjust the air-fuel ratio may include an actuator for adjusting engine speed, various fuel injectors or fuel control valves controlling the flow of one or more fuels to the engine cylinders, and an engine bypass valve configured to divert intake air away from the engine before it reaches the engine cylinders. FIG. 3 shows an example of an engine bypass valve arranged in a bypass passage coupled to each of two intake passages and a bypass discharge duct. FIG. 4 shows a method for adjusting the one or more actuators to adjust the air-fuel ratio for combustion to a desired air-fuel ratio. The desired air-fuel ratio may be based on a changed operating condition of the engine and knock and misfire thresholds for the engine operating conditions and air-fuel ratio. The controller may decide which individual or combination of engine actuator adjustments to make responsive to the change in the desired air-fuel ratio based on the changed operating condition and/or current engine operating conditions, as shown at FIGS. 5-6. FIG. 7 shows one example embodiment for adjusting multiple engine actuators to adjust the air-fuel ratio in response to a change in notch level or a wheel slip condition. FIG. 8 shows example engine actuator adjustments responsive to changes in the desired air-fuel ratio for combustion at the engine cylinders.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Referring to FIG. 1, a schematic diagrammatical representation of a vehicle 10 moving from a first operating point to a second operating point along a predefined path is disclosed. In the illustrated embodiment, the vehicle is a rail vehicle, such as a locomotive. For example, as depicted in FIG. 1, the rail vehicle is configured to run on a rail 17 via a plurality of wheels 15. Suitable vehicles include passenger and non-passenger vehicles, hybrid vehicles, off-highway vehicles, on-road vehicles (such as tractor trailers), tracked vehicles, rail vehicles, and the like. The vehicle includes a dual fuel engine 12 and an exemplary control system 14 coupled to the dual fuel engine.

In the illustrated embodiment, the vehicle is driven by the engine utilizing a plurality of fuels. In the exemplary engine, a reduction in nitrogen oxide (NOx) and particulate matter (PM) emissions is enabled by combusting a relatively larger fraction of the premixed fuel. However, relative costs and availability of different fuels are constantly in flux. For example, in some embodiments, diesel and natural gas may be utilized to drive the engine. If the cost of diesel increases relative to the cost of the natural gas, more natural gas may be used resulting in reduced cost and emissions. If the cost of natural gas is increased relative to the cost of the diesel, then more diesel may be used to drive the engine. It should be noted herein that in certain embodiments, the vehicle may also utilize other fuels instead of diesel and natural gas. A ratio of secondary fuel (e.g., natural gas) to total fuel (secondary fuel and primary fuel (e.g., diesel fuel)) delivered to the engine for combustion may be referred to herein as a substitution ratio.

In one embodiment, the rail vehicle is a diesel-electric vehicle. As depicted in FIG. 1, the engine is coupled to an electric power generation system, which includes an alternator/generator 11 and electric traction motors 13. For example, the engine is a diesel and/or natural gas engine that generates a torque output that is transmitted to the alternator/generator which is mechanically coupled to the engine.

The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of the plurality of wheels to provide tractive power to propel the rail vehicle. One example configuration includes one traction motor per wheel set. As depicted herein, six traction motors correspond to each of six pairs of motive wheels of the rail vehicle. In another example, alternator/generator may be coupled to one or more resistive grids 19. The resistive grids may be configured to dissipate excess engine torque via heat produced by the grids from electricity generated by alternator/generator. In alternate embodiments, excess engine torque may be dissipated to an alternate component, such as an energy storage device.

The vehicle includes a wheel spin detector (e.g., sensor) 21 which is in electronic communication with the control system 14 (and the signal acquisition system 60, as shown in FIG. 2 and described further below). The wheel spin detector is configured to detect a wheel slip condition of the vehicle. During a wheel slip condition, a turning force applied to the wheels may exceed the opposing friction force affected by the surface of the rail, and the wheels will turn without being able to move the rail vehicle forward. This may result in degradation of both the drive mechanism of the rail vehicle and the rail. Further, during wheel slip, in order to reduce and/or arrest the wheel slip, an engine load may be reduced instantaneously at any given notch setting of the engine. As a result, power output drops at a given engine speed. In response to wheel slip, the control unit may adjust engine operating conditions to reduce engine power output and reduce a likelihood of engine misfire. For example, as explained further below with reference to FIGS. 4-7, the controller may adjust a flow of natural gas and/or flow of diesel to the engine, adjust diesel injection timing, and/or adjust airflow to the engine via adjusting one or more of an engine bypass valve, compressor recirculation valve, and wastegate, in response to vehicle wheel slip conditions.

The control system 14 is configured to alter one or more of a speed of the dual fuel engine, fuel flow to the dual flow engine, and a position of an engine bypass valve (as shown in FIGS. 2-3) to obtain a determined air-fuel ratio in response to a changed operating condition of the dual fuel engine, so as to maintain operation of the dual fuel engine between knock and misfire conditions (e.g., operate the engine within an air-fuel ratio range at which engine knock and misfire may not occur). Further, the control technique may allow the dual fuel engine to operate at a relatively high substitution ratio (e.g., 80% natural gas to diesel fuel) and maintain emissions from the dual fuel engine within a determined emission limit, fuel consumption of the dual fuel engine within a predetermined fuel consumption limit, a peak in-cylinder pressure within a predetermined pressure limit, and/or an exhaust manifold temperature within a predetermined temperature limit. The control system and methods for controlling the air-fuel ratio of the engine are explained in greater detail below with reference to subsequent figures.

Referring to FIG. 2, a schematic diagrammatical representation of the dual fuel engine 12 having fuel consumption and exhaust emission control features is illustrated in accordance with embodiments of the present invention. As discussed in further detail below, embodiments of the present invention provide monitoring and control features, such as sensors and control logic to control operation of the engine between knock and misfire conditions and at a desired air-fuel ratio. For example, during conditions such as when there is a change in an operating condition (e.g., a change in altitude/ambient temperature, engine load, or the like), an air-fuel ratio for combustion at cylinders of the engine may be maintained within acceptable/desirable levels through control techniques discussed below.

As illustrated in FIG. 2, the engine has two cylinder banks, including a first engine cylinder bank 210 and a second cylinder bank 212, each cylinder blank including a plurality of cylinders. For example, as depicted in FIG. 2, the engine is a V-12 engine having twelve cylinders. In other examples, the engine may be a V-6, V-8, V-10, V-16, I-4, I-6, I-8, opposed 4, or another engine type. A first set of cylinders 24 of the first cylinder bank receive intake air from a first intake manifold 220 and supply exhaust gas to a first exhaust manifold 214. A second set of cylinders 23 of the second cylinder bank received intake air from a second intake manifold 222 and supply exhaust gas to a second exhaust manifold 216. The first and second exhaust manifolds converge together at a common exhaust passage 218.

The engine receives intake air for combustion from an intake, including the first and second intake manifolds. The intake may be any suitable conduit or conduits through which gases flow to enter the engine. For example, the intake may include the first and second intake manifolds, a common intake passage 224, a first branch intake passage 226, a second branch intake passage 228, and the like. The common intake passage receives ambient air from an air filter (not shown) that filters air from outside of a vehicle in which the engine may be positioned. Exhaust gas resulting from combustion in the engine is supplied to an exhaust, such as the first and second exhaust manifolds and the common exhaust passage. Exhaust gas flows through the common exhaust passage, and out of an exhaust stack of the rail vehicle.

The engine system shown in FIG. 2 includes a single turbocharger 19. However, in other embodiment, the engine may include multiple turbochargers. The turbocharger includes a compressor 20 and a turbine 22 and is operated to supply compressed air to the first and second intake manifolds via the first and second branch intake passages, respectively, for combustion within the plurality of cylinders. The turbine is positioned within the common exhaust passage, such that the exhaust gases expand through the turbine, putting work onto and rotating a turbocharger shaft 25 coupled to the compressor. A wastegate 244 is included in a bypass passage around the turbine. The control unit may actuate the wastegate into a position that diverts exhaust gas around the turbine responsive to a command to reduce boost pressure supplied to the engine. Similarly, a compressor bypass valve 246 is included in a bypass passage around the compressor. The control unit may actuate the compressor bypass valve into a position that diverts intake air from downstream of the compressor to upstream of the compressor responsive to compressor surge and/or a command to reduce boost pressure supplied to the engine.

The compressor draws ambient air from the common intake passage and provides compressed air to each of the first and second branch intake passages. The first branch intake passage includes a first intercooler (e.g., charge air cooler) 202 and the second branch intake passage includes a second intercooler (e.g., charge air cooler 204. The temperature of the intake air is increased due to compression through the compressor. The compressed air (e.g., charge air) from the compressor flows through each of the first and second intercoolers such that the temperature of the charge air is reduced prior to delivery into the first and second intake manifolds of the engine. In one embodiment, the two intercoolers of the engine are air-to-water heat exchangers, which utilize a coolant to facilitate removal of heat from the compressed air. In another embodiment, the two intercoolers are air-to-air heat exchangers, which utilize ambient air to facilitate removal of heat from the compressed air. In another embodiment, the two intercoolers are a combination of an air-to-air heat exchanger and an air-to-water heat exchange, which utilizes both ambient air and liquid to facilitate removal of heat from the compressed air.

As shown in FIG. 2, a bypass passage 230 is positioned between the first branch intake passage, downstream of the first intercooler and upstream of the first intake manifold, and the second branch intake passage, downstream of the second intercooler and upstream of the second intake manifold. In this way, the bypass passage is coupled between the two parallel intake passages to the engine. The bypass passage includes an engine bypass valve 232 in communication with each of the first branch intake passage, the second branch intake passage, and a bypass discharge passage 234. As such, the engine bypass valve may be a three-way valve. When the engine bypass valve is in an open position, intake air may be directed from each of the first branch intake passage and the second branch intake passage to the bypass discharge passage. The bypass discharge passage may discharge the intake air external to the engine and/or external to the rail vehicle. For example, the bypass discharge passage may direct intake air outside of the rail vehicle and to atmosphere. Since the engine shown in FIG. 2 does not include an exhaust gas recirculation system, only fresh intake air that does not contain exhaust gas is discharged to the environment via the bypass discharge passage. By opening the engine bypass valve so that the bypass discharge passage is in fluid communication with both of the first and second branch intake passages, intake air from both of the first and second branch intake passages may be directed away from the first and second intake manifolds and the engine cylinders. As a result, an air-fuel ratio to the engine cylinders may be reduced, as explained further below. In another embodiment, the engine bypass valve may be configured to divert intake air away from only the first branch intake passage, only the second branch intake passage, or both the first and second branch intake passages and to the bypass discharge passage. In this way, the control system may individually control the airflow to the first and second engine cylinder banks.

In alternate embodiments, the engine may include two bypass passages and two engine bypass valves, each of the bypass passages coupled to one of the branch intake passages. As such, each of the first and second branch intake passage may be have their own bypass passages and engine bypass valve and the control system 14 may individually control the two engine bypass valve in order to individually control the amount of intake air flowing to each of the first and second engine cylinder banks.

Though FIG. 2 shows two branch intake passages, each going to a different cylinder bank of the engine, in other embodiments, it is possible for the engine to only include one intake passage and a common intake manifold for both cylinder banks. As such, the compressor may discharge charge air to only one intake passage. In this embodiment, there may be only one intercooler in the one intake passage and the bypass passage may couple directly to the one intake passage and be configured to divert intake air away from the common intake passage, upstream of the common intake manifold, via the engine bypass valve and bypass discharge passage before the air enters the engine cylinders.

The common exhaust passage also includes a pre-turbo diesel oxidation catalyst (DOC) 206 positioned upstream of the turbine. A pre-turbo DOC bypass 236 including a pre-turbo bypass valve 238 are positioned around the pre-turbo DOC and configured to divert exhaust gas around the pre-turbo DOC before flowing to the turbine. The common exhaust passage also includes a post-turbo DOC 208 positioned downstream of the turbine. A post-turbo DOC bypass 240 including a post-turbo bypass valve 242 are positioned around the post-turbo DOC and configured to deliver exhaust gas around the post-turbo DOC before exiting the engine system.

The control system 14 also includes a control unit 40. In one embodiment, the control unit (also referred to herein as the controller) is an electronic logic controller that is programmable by a user. In the illustrated embodiment, a plurality of sensors including an exhaust gas constituent sensor (e.g., an emission sensor, an exhaust oxygen sensor, or an air-fuel sensor) 42, first and second intake manifold temperature sensors 43 and 44, first and second exhaust manifold temperature sensors 45 and 46, first and second mass air flow sensors 47 and 48, an altitude sensor/ambient pressure sensor 50, an ambient temperature sensor 52, an engine speed sensor 51, and a fuel injection timing sensor 53 are configured to measure an air-fuel ratio of the combusted exhaust gas, intake manifold temperature of the first and second intake manifolds, exhaust manifold temperature of the first and second exhaust manifolds, first and second mass air flows (MAF) to the first and second intake manifolds, altitude/ambient pressure of operation, ambient temperature, engine speed, and fuel injection timing, respectively. The engine may further include a knock sensor 57 and a misfire sensor 58 which measure engine knock and misfire conditions, respectively. In another example, engine knock and/or misfire may be inferred based on outputs from alternative engine sensors. The control unit 40 receives the corresponding output signals from the plurality of sensors 42, 43, 44, 45, 46, 47, 48, 50, 51, 52, 53, 57, and 59. In some embodiments, the engine may include additional temperature and/or pressure sensors measuring various temperatures and pressure of the engine.

In one embodiment, the control unit includes an electronic speed control unit for the engine. The control unit is operable to produce a speed signal to control a speed of the engine (e.g., engine speed). A plurality of fuel injectors (not shown) are used for injecting a plurality of fuels (for example, diesel and natural gas) into the plurality of cylinders of the engine. Specifically, natural gas is injected into the first and second intake manifolds of the engine via natural gas supply paths 56 from a natural gas supply 61. A fuel injector 55 is used to inject diesel via diesel supply paths 54 into the plurality of cylinders of the engine. A piston (not shown) is slidably disposed in each cylinder and reciprocates between a top dead center and a bottom dead center position. The control unit receives corresponding output signals from the sensors described herein and, in response to the received output signals, is operable to produce output signals (e.g., actuation signals) to adjust one or more engine actuators to control the speed of the engine, control fuel injection of diesel and/or natural gas to the engine, and/or adjust a position of one or more of the engine bypass valve, wastegate, and compressor recirculation valve. The one or more engine actuators may include fuel injectors, the engine bypass valve, the compressor recirculation valve, the wastegate, alternator load, or the like.

A signal acquisition system 60 receives the plurality of signals from the plurality of sensors described above and transmits the plurality of signals to the control unit configured to alter one or more of a speed of the engine, a substitution ratio of natural gas, a flow of natural gas and/or diesel to the engine, and/or a position of the engine bypass valve 232 to obtain a determined air-fuel ratio in response to a changed operating condition of the dual fuel engine determined based on the plurality of signals. The determined air-fuel ratio may be an air-fuel ratio that allows engine operation within a knock and misfire window for the current operating conditions, as explained further below. The control unit includes a database 62, an analytic engine 64, a processor 66, and a memory 68.

The database may be configured to store predefined information about the engine. For example, the database may store information relating to quantity of the exhaust emissions, air-fuel ratio, intake manifold temperature, exhaust manifold temperature, airflow, altitude/ambient pressure of operation, ambient temperature of operation, engine speed, fuel injection timing, reference ambient temperature, reference ambient pressure, or the like. Furthermore, the database may be configured to store actual sensed/detected information from the above-mentioned sensors of the engine. The database may further include various look-up tables and/or stored data related to an air-fuel ratio range at certain engine operating conditions (e.g., notch level, engine speed, air flow level, or the like) that maintain the engine operating within set knock and misfire thresholds. For example, at certain engine operating condition, there may be a first known air-fuel ratio that is likely to cause misfire and a second known air-fuel ratio that is likely to cause engine knock. As such, the look-up tables may provide a reference of a range of air-fuel ratios that maintain the engine between misfire and knock conditions or within a range that results in acceptable exhaust temperatures, cylinder pressures, and emissions levels. In this way, the control unit may adjust engine operation based on this stored data and current engine operating conditions (based on received signals from the engine sensors) in order to maintain engine operation within a knock and misfire window for the current operating conditions.

In one embodiment, the database may be stored in a single memory module at one location. In other embodiments, the database may be stored in a plurality of memory modules in a distributed manner. The database may be at least one of a SQL database, an Oracle database, and a MySQL database. In alternate embodiments, other types of databases including relationship database systems (RDBS) may be used to store the plurality of rules. It may be noted herein that in one embodiment, the database is a customized database. In other embodiments, the database may be an off-the-shelf database.

The analytic engine is communicatively coupled to the database. The analytic engine may be stored in the memory and executable by the processor. In an alternate embodiment, the analytic engine may also be a specialized hardware such as a Field Programmable Gate Array (FPGA). In the illustrated embodiment, the analytic engine may include instructions, including various codes and routines, configured to execute control routines for the engine. The instructions may then be executed by the processor. As one example, and as explained further below, the instructions may include a routine for determining if a changed operating condition has occurred that changes a desired air-fuel ratio. As such, the routine may include determining the desired air-fuel ratio based on the changed conditions and then adjusting one or more engine actuators to adjust the air-fuel ratio for combustion (e.g., injected into the engine cylinders) to the desired air-fuel ratio. Adjusting the one or more engine actuators may include adjusting one or more actuators to adjust airflow to the engine cylinder and/or fuel flow to the engine cylinders in order to alter the air-fuel ratio. In this way, either an airflow amount, a fuel amount, or both, may be adjusted in order to adjust the air-fuel ratio.

As explained above, the various control instructions stored in the memory may be accessible and executable by the processor. The processor is communicatively coupled to the database and the analytic engine. The processor may include at least one arithmetic logic unit, microprocessor, general purpose controller or other processor arrays to perform the desired computations. In one embodiment, the processor is a custom hardware configured to perform functions of the analytic engine and the signal acquisition system. In another embodiment, the processor is a digital signal processor or a microcontroller. The processor may also be configured to manage the contents of the database. In some embodiments, other type of processors, operating systems, and physical configurations are envisioned.

The memory is coupled to the processor. The memory is configured to store instructions performed by the processor and contents of the database. The memory may be a non-transitory storage medium. For example, the memory may be a dynamic random access memory (DRAM) device, a static random access memory (SRAM) device, flash memory, or other memory devices. In one embodiment, the memory may include a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In one embodiment, the memory may be communicatively coupled to the processor. In an alternate embodiment, the memory is an on-board memory of the processor.

In an exemplary embodiment, the non-transitory computer readable medium encoded with a program, instructs the processor to perform functions associated with the control unit for altering air flow and/or fuel flow to the dual fuel engine to obtain a determined air-fuel ratio in response to a changed operating condition of the dual fuel engine. The program instructions include one or more functions of the database, the analytic engine, and the signal acquisition system.

FIG. 3 shows a cross-section view of an embodiment of the engine 12 shown in FIGS. 1-2. The cross-section view shows the various ducting of the various airflow passages of the intake system of the engine. Specifically, FIG. 3 shows a turbo compressor inlet 302 to the compressor (e.g., the compressor 20 shown in FIG. 2). Intake air from the intake passage flows into the turbo compressor inlet and into the compressor where it is compressed. The compressed air then exits the compressor via two outlets: a first turbo compressor outlet 304 and a second turbo compressor outlet 306. Each of the turbo compressor outlets is coupled to a different branch intake passage (e.g., such as the first and second branch intake passages 226 and 228 shown in FIG. 2). Charge air flows through each branch intake passage and to a respective intercooler (of the two intercoolers). Cooled charge air then flows through a first compressed intake air duct 308 and a second compressed intake air duct 310, each positioned downstream of a respective intercooler. The first compressed intake air duct may be part of the first branch intake passage and the second compressed intake air duct may be part of the second branch intake passage shown in FIG. 2. Intake air from the first compressed intake air duct then flows to a first engine cylinder bank of the engine where it is combusted with fuel in the cylinders of the first engine cylinder bank. Likewise, intake air from the second compressed intake air duct flows to the second engine cylinder bank of the engine where it is combusted with fuel injected into the cylinders of the second engine cylinder bank.

As shown in FIG. 3, the first and second compressed intake air ducts are arranged parallel to one another, with the turbo compressor inlet arranged between the first and second compressed intake air ducts. A bypass passage 230 is arranged between each of the first and second compressed intake air ducts. The ducting of the bypass passage includes a T-connection coupled to the engine bypass valve 232. The bypass passage is coupled directly to the first compressed intake air duct, the second compressed intake air duct, and a bypass discharge passage 234 via the engine bypass valve. As shown in FIG. 3, a first end of the bypass passage is coupled to a sidewall of the first compressed intake air duct at a location downstream of the first intercooler and upstream of the first engine cylinder bank. A second end of the bypass passage is coupled to a sidewall of the second compressed intake air duct at a location downstream of the second intercooler and upstream of the second engine cylinder bank. Both of the first and second compressed intake air ducts are coupled to the common bypass discharge passage via the engine bypass valve. The engine bypass valve is coupled to a valve actuator 312 which is adapted to open and close the bypass valve in response to signals received from the engine controller (e.g., control unit 40 shown in FIG. 2). As shown in FIG. 3, the bypass discharge passage is arranged between the first and second compressed intake air ducts and to one side of the turbo compressor inlet. For example, the bypass discharge passage extends downward (with respect to ground on which the vehicle in which the engine is installed sits) from the bypass passage, past the turbo compressor inlet and along the side of the second compressed intake air duct. The bypass discharge passage may then exit the engine and/or the vehicle to discharge intake air exterior to the engine and/or vehicle.

In a typical diesel engine, ignition occurs by a diffusion burn flame, when diesel is injected into a combustion chamber. As such, the combustion process is not as susceptible to knock for most conditions and misfire is less of a concern. The diesel diffusion flame relies on mass transfer to sustain the combustion and is not well mixed in the combustion chamber. On the other hand, for a dual fuel/natural gas engine that is intake/port injected, ignition occurs by a pre-mixed flame in which a spark or injection of a small amount of diesel fuel initiates combustion. A flame then propagates through a combustion chamber, which has a homogeneous, or nearly homogeneous, mixture (as opposed to the diffusion flame of diesel engine). The difference between a pre-mixed flame of a natural gas/dual fuel engine and a diffusion flame of a diesel engine, results in requirement for different airflows to the two types of engines, resulting in operational differences. For instance, airflow control is important for a dual fuel engine to reduce occurrences of knock and/or misfire. The two types of engines also have different emissions output as a pre-mixed natural gas/dual fuel engine generates higher unburned hydrocarbon (UHC) and carbon monoxide (CO) emissions while a diffusion flame in diesel engine generates higher particulate matter (PM) emissions. For example, if an air-fuel ratio is too low in a diesel engine, then particulate matter emissions and exhaust temperatures may increase. In lean burn, spark-ignited, gas engines or dual fuel engines, knock or misfire may occur is accurate air-fuel ratio control is not maintained. Hence, there is a requirement for different control mechanisms for the different engines to meet emission regulations. Methods for controlling airflow and/or fuel flow to the engine in order to reduce knock and misfire events, especially during changed operating conditions such as changes in engine load, or for maintaining target emissions levels, engine efficiencies, exhaust temperatures, and/or peak cylinder pressures, are presented herein with reference to FIGS. 4-7.

Turning to FIG. 4, a flow chart showing a method 400 for controlling an engine (e.g., such as the dual fuel engine 12 shown in FIGS. 1-3) is disclosed. Method 400 may also be used to control operation of a single fuel diesel or gas engine. In particular, method 400 is a method for adjusting engine operation to obtain a desired air-fuel ratio (e.g., an air-fuel ratio for combustion in engine cylinders) in response to a changed operating condition that changes the desired air-fuel ratio. As explained further below, the changed operating condition may be a condition that moves engine operation toward operation that may result in engine knock or engine misfire. The changed operating condition may also be a change in engine power demand, emissions level, exhaust temperature, and/or peak cylinder pressure. As such, based on the changed operating condition, an engine controller (e.g., such as the control unit 40 shown in FIG. 2) may adjust the air-fuel ratio delivered to the engine cylinders to a level that is within a range where knock and misfire are less likely to occur when the air-fuel ratio at the level is combusted by the engine (referred to herein a knock and misfire window). Adjusting the air-fuel ratio delivered to the engine cylinders may include adjusting one or more engine actuators to adjust one or more of an amount of airflow or amount of fuel injected into the engine cylinders. In this way, instructions for carrying out method 400 and the rest of the methods described herein may be stored in a memory of the controller and executed by a processor of the controller.

Method 400 begins at 402 by estimating and/or measuring engine operating conditions. Engine operating conditions include engine speed, engine power demand (e.g., engine load or engine notch level), mass air flow to the engine, engine temperature, exhaust air-fuel ratio, indications of engine knock, indications of engine misfire, indications of wheel slip, or the like. At 404, the method includes determining if there is a changed operating condition that results in a change in a desired air-fuel ratio for injection into engine cylinders of the engine (e.g., for combustion). The changed operating condition may include one or more of a change in engine load (e.g., a change in engine load indicated by a change in notch level), a wheel slip condition (e.g., as measured by a wheel spin detector of the vehicle), an indication of engine knock, and an indication of engine misfire. The changed operating condition may also include one or more of a change in a measured oxygen level in an exhaust passage of the engine, a change in the substitution ratio of natural gas injected into the engine, a change in intake manifold pressure, a change in ambient temperature or pressure, a change in exhaust emissions, a change in exhaust temperature, a change in peak cylinder pressure, and/or a change in the speed of the engine. As one example, the indications of engine knock and engine misfire may be indicated based on signals received from dedicated engine knock and misfire sensors of the engine. As another example, the indications of engine knock and engine misfire may be inferred based on alternate engine operating conditions. For example, conditions for engine knock and engine misfire, such as certain combinations of engine load, engine speed, and air-fuel ratio, may be stored in a memory of the controller (e.g., in the form of one or more look-up tables). As such, based on a change in engine load and a current air-fuel ratio being combusted by the engine cylinders, the controller may predict if engine misfire or engine knock are expected. Further as explained above, during a wheel slip condition, the controller may automatically reduce a load of the engine (e.g., by reducing notch level). Thus, the changed operating condition may be a reduction in engine load due to a wheel slip condition of the vehicle in which the engine is installed (e.g., such as the rail vehicle 10 shown in FIG. 1).

If there is not a changed operating condition at 404 that results in a change in the desired air-fuel ratio, the method continues to 406 to maintain engine operating parameters. Alternatively, if there is a changed operating condition that changes the desired air-fuel ratio at 404, the method continues to 408 to determine the desired air-fuel ratio based on the changed condition and a knock and misfire window of the engine. As defined herein, the knock and misfire window may be a range of air-fuel ratios for the current engine operating conditions where engine knock and engine misfire may not occur. If engine operation is outside of this window, engine misfire or engine knock may occur (depending on which side of the window the engine is operating). For example, in a dual fuel engine, higher air-fuel ratios may lead to misfire while lower air-fuel ratios may lead to knock. Therefore, by operating between knock and misfire thresholds (e.g., within the knock and misfire window), engine misfire and knock events may be reduced, thereby increasing engine efficiency. Thus, the controller may determine a new desired air-fuel ratio for the new, changed operating conditions (e.g., the change in load or wheel slip) which may avoid or reduce the likelihood of engine misfire and knock. In this way, the desired air-fuel ratio may be based on the changed operating condition and known knock and misfire data for a range of air-fuel ratios and engine operating conditions which may be stored in the memory of the controller.

At 410, the method includes adjusting one or more engine actuators to adjust the current air-fuel ratio being combusted at the engine cylinders (e.g., prior to the changed operating condition) to the newly determined desired air-fuel ratio. As one example, adjusting the one or more engine actuators includes adjusting a speed of the engine at 412. The method at 412 may include increasing the engine speed to increase airflow to the engine cylinders in response to an increase in the desired air-fuel ratio from the previously combusted (e.g., the currently combusted air-fuel ratio prior to the adjusting) air-fuel ratio or decreasing the engine speed to decrease airflow the engine cylinders in response to a decrease in the desired air-fuel ratio from the previously combusted air-fuel ratio. The controller may adjust engine speed by adjusting a load on the engine from the alternator/generator and/or adjusting fueling (e.g., actuating an actuator of a fuel injector to increase or decrease fueling to the engine cylinders).

As another example, adjusting the one or more actuators at 410 may include adjusting fuel flow to the engine at 414. Adjusting the fuel flow may include adjusting an amount of fuel injected into the engine cylinders. In the case of a dual fuel engine where the engine combusts two fuels, such as natural gas and diesel, the adjusting the fuel flow may include adjusting the amount of natural gas flowing to the engine cylinders, adjusting the amount of diesel flowing (e.g., injected into) the engine cylinders, and/or adjusting a substitution ratio of fuel injected into the engine cylinders. It should be noted herein that the term substitution ratio is referred to as ratio of the quantity of plurality of fuels injected into the engine. For example, if diesel and natural gas are used, the substitution ratio is the ratio of quantity of natural gas to the total quantity of fuel (natural gas and diesel) supplied to the dual fuel engine. As such, adjusting the fuel flow at 414 may include adjusting actuators such as fuel injectors or fuel flow control valves coupled to the engine. As yet another example, adjusting the one or more actuators at 410 may include adjusting a position (e.g., an amount of opening) of an engine bypass valve (e.g., such as the engine bypass valve 232 shown in FIGS. 2-3). As explained above, the engine bypass valve may be a valve positioned in a bypass passage coupled to an intake passage of the engine at a position upstream of the engine cylinders and downstream of the compressor. When the engine bypass valve is open to the intake passage (referred to herein as an open position), compressed intake air may flow out of the intake passage (before entering the engine cylinders) and to a bypass discharge passage that routes the intake air to a location exterior to the engine (which may also be exterior to a vehicle in which the engine is installed). In this way, opening the engine bypass valve, or increasing a percentage of opening of the engine bypass valve may decrease the amount of airflow to the engine cylinders and thereby decrease the air-fuel ratio. The engine bypass valve may be adjusted into a fully open position, a fully closed position, or a plurality of positions between the fully open and fully closed position based on the desired air-fuel ratio. In this way, the engine bypass valve may be adjusted to increase or decrease the amount of airflow to the engine, thereby increasing or decreasing the air-fuel ratio. The controller may adjust only one of the engine speed, fuel flow, or engine bypass valve at 410 to deliver the desired air-fuel ratio to the engine cylinders. As another example, the controller may adjust more than one of the engine speed, fuel flow, or engine bypass valve to deliver the desired air-fuel ratio to the engine cylinders. The controller may determine which one or combination of the adjustments at 412, 414, and 416 to make based on the changed operating condition that caused the change in the desired air-fuel ratio and/or the degree of the change in the desired air-fuel ratio, as explained further below in reference to FIGS. 5-7.

Turning to FIGS. 5-6, a method 500 is shown for selecting a mode for adjusting the air-fuel ratio into the desired air-fuel ratio determined based on the changed operating condition in method 400 (e.g., as determined at 408). Each mode includes adjusting a single engine parameter or combination of multiple engine parameters in order to adjust the air-fuel ratio into the determined desired air-fuel ratio.

At 502, the method includes determining if there is a change in the desired air-fuel ratio. The change in the desired air-fuel ratio may be determined based on the changed operating condition, as determined at 404 and 408 in method 400. If desired air-fuel ratio has not changed from the current air-fuel ratio used for combustion, the method continues to 504 to maintain engine operating parameters. However, if there is a change in the desired air-fuel ratio from the current air-fuel ratio, the method continues to 506 to select a mode for adjusting the air-fuel ratio (e.g., the ratio of the amount of intake air and fuel delivered to the engine) into the changed, desired air-fuel ratio. The mode selection may be based on the changed operation condition that resulted in the change in the desired air-fuel ratio (e.g., wheel slip condition, change in load, indication of engine knock or misfire, or the like), the magnitude of the change in the desired air-fuel ratio, and/or additional engine operating conditions (e.g., such as engine load). For example, different modes may be selected based on whether the change in the desired air-fuel ratio is greater or less than a threshold amount of change. As described further below, airflow adjustments may adjust the air-fuel ratio more slowly than fuel flow adjustments. Thus, in one example, adjusting the air-fuel ratio via airflow adjustments (e.g., by adjusting the engine bypass valve or engine speed) may be used for smaller changes in the desired air-fuel ratio and/or when a slower response in the air-fuel ratio is acceptable. In another example, adjusting the air-fuel ratio via fuel adjustments (e.g., by adjusting the amount of diesel, natural gas, or the substitution ratio) may be used for larger changes in the desired air-fuel ratio and/or when a quicker response in the air-fuel ratio is required (e.g., due to being close to knock or misfire conditions).

After selecting the desired mode for adjusting the air-fuel ratio, the method continues to 508 to determine if the first mode is selected. If the first mode is selected, the method continues to 510 to adjust only engine speed to deliver the desired air-fuel ratio to the engine cylinders. In this way, the controller may increase or decrease engine speed by an amount that will deliver the desired air-fuel ratio to the engine cylinders while maintaining a current fueling level to the engine cylinders. As one example, the first mode may be selected when knock or misfire are indicated or when the change in the desired air-fuel ratio occurs while a power level of the engine is maintained and/or when a notch level is not changing. In another example, the first mode may be selected in response to decreased (e.g., poor) combustion efficiency or increased emissions (e.g., increased particulate matter emissions).

If the first mode is not selected, the method continues to 512 to determine if the second mode is selected. If the controller selects the second mode, the method continues to 514 to adjust only fuel flow to the engine cylinders to deliver the desired air-fuel ratio. Fuel flow adjustments may include adjusting natural gas flow, adjusting diesel flow, and/or adjusting the substitution ratio, as described above with reference to 414 in method 400. In this way, the controller adjusts fuel flow by an amount that delivers the desired air-fuel ratio to the engine while maintaining airflow at a current level. As one example, the second mode may be selected when wheel slip is indicated and/or when the change in the desired air-fuel ratio due to a change in engine load (e.g., engine power output) is greater than the threshold amount of change. In this way, the faster responding fuel rate may be used to more quickly adjust fueling and consequently the air-fuel ratio than if airflow changes were used to adjust the air-fuel ratio.

If the second mode is not selected, the method continues to 516 to determine if the third mode is selected. If the controller selects the third mode, the method continues to 518 to adjust only the engine bypass valve to deliver the desired air-fuel ratio to the engine cylinders. In this way, the controller may increase or decrease an amount (e.g., percentage) of opening of the engine bypass valve in order to decrease or increase, respectively, the amount of airflow flowing to the engine cylinders in order to deliver the desired air-fuel ratio. For example, as the desired air-fuel ratio decrease by a larger amount, the controller may increase the opening of the engine bypass valve by a larger amount, thereby decreasing the amount airflow traveling to the engine cylinders. As one example, the controller may select the third mode when wheel slip is indicated and/or when the change in the desired air-fuel ratio due to a change in engine load (e.g., a change in the notch level of the engine) is below the threshold amount of change. The first mode may further be selected when the engine speed cannot be adjusted to adjust airflow.

If the third mode is not selected, the method continues to 520 to determine if the fourth mode is selected. If the controller selects the fourth mode, the method continues to 522 to adjust both fuel flow to the engine cylinders and the engine bypass valve to deliver the desired air-fuel ratio to the engine cylinders. For example, if the desired air-fuel ratio increases from the current air-fuel ratio, the method at 522 may include reducing an amount of opening of the engine bypass valve while also decreasing fueling to the engine cylinders. As one example, adjusting the fuel flow and engine bypass valve may occur concurrently with one another, thereby increasing a rate at which the air-fuel ratio is adjusted into the desired air-fuel ratio. In this way, the fuel flow and engine bypass valve adjustments are coordinated in order to deliver the desired air-fuel ratio to the engine. As one example, the controller may select the fourth mode when the change in the desired air-fuel ratio is greater than the threshold amount of change and/or when knock or misfire are occurring. FIG. 7, described in further detail below, shows additional examples of adjusting both the engine bypass valve and fuel flow to the engine in response to engine notch changes.

If the fourth mode is not selected, the method continues to 524 to determine if the fifth mode is selected. If the controller selects the fifth mode, the method continues to 526 to adjust both fuel flow to the engine cylinders and engine speed to deliver the desired air-fuel ratio to the engine cylinders. For example, if the desired air-fuel ratio increases from the current air-fuel ratio, the method at 526 may include increasing engine speed while also decreasing fueling to the engine cylinders. As one example, adjusting the fuel flow and engine speed may occur concurrently with one another, thereby increasing a rate at which the air-fuel ratio is adjusted into the desired air-fuel ratio. In this way, the fuel flow and engine speed adjustments are coordinated in order to deliver the desired air-fuel ratio to the engine. As one example, the controller may select the fifth mode when the change in the desired air-fuel ratio is greater than the threshold amount of change and/or when the engine bypass valve cannot be adjusted (e.g., due to it already being in a fully open or fully closed position when an increase or decrease in the amount of opening, respectfully, is required to deliver the desired air-fuel ratio).

If the fifth mode is not selected, the method continues to 528 (shown in FIG. 6, continued from FIG. 5) to determine if the sixth mode is selected. If the controller selects the sixth mode, the method continues to 530 to adjust both engine speed and the engine bypass valve to deliver the desired air-fuel ratio to the engine cylinders. For example, if the desired air-fuel ratio increases from the current air-fuel ratio, the method at 530 may include increasing engine speed while also decreasing the amount of opening of the engine bypass valve, thereby increasing the amount of airflow delivered to the engine. As one example, adjusting the engine bypass valve and engine speed may occur concurrently with one another, thereby increasing a rate at which the air-fuel ratio is adjusted into the desired air-fuel ratio. In this way, the engine bypass valve and engine speed adjustments are coordinated in order to deliver the desired air-fuel ratio to the engine. As one example, the controller may select the sixth mode when the change in the desired air-fuel ratio is less than the threshold amount of change, but greater than a level that the engine speed or engine bypass valve adjustments alone could produce the required airflow amount for the desired air-fuel ratio.

If the sixth mode is not selected, the method continues to 532 (shown in FIG. 6) to determine if the seventh mode is selected. If the controller selects the seventh mode, the method continues to 534 to adjust each of the engine speed, fuel flow to the engine cylinders, and the engine bypass valve to deliver the desired air-fuel ratio to the engine cylinders. For example, if the desired air-fuel ratio increases from the current air-fuel ratio, the method at 534 may include increasing engine speed while also decreasing the amount of opening of the engine bypass valve and decreasing fuel flow to the engine cylinders, thereby both increasing the amount of airflow delivered to the engine and decreasing the amount of fuel delivered to the engine. As one example, the controller may select the seventh mode when the change in the desired air-fuel ratio is greater than the threshold amount of change and knock or misfire are expected based on the change in the desired air-fuel ratio. If none of the modes are selected, the method ends.

Turning to FIG. 7, a method 700 is shown for adjusting multiple engine actuators responsive to transient conditions such as wheel slip, an increase in engine load (e.g., an increase in notch level), or a decrease in engine load (e.g., a decrease in notch level) in order to adjust an air-fuel ratio for combustion to reduce misfire, knock, and high hydrocarbon emission conditions. Method 700 may be an example of adjusting fuel flow and/or and engine bypass valve (e.g., such as engine bypass valve 232 shown in FIGS. 2-3) in response to a change in a desired air-fuel ratio (e.g., as shown at 410 in FIG. 4 and at 522 in FIG. 5). For example, as introduced above, during a wheel slip condition, the load on the engine drops suddenly to arrest the wheel slip. This reduction in load may require an immediate reduction in fuel delivered to engine cylinders. While reduced diesel quantity may burn well in the cylinder, reduced natural gas may cause high in-cylinder air-fuel ratio for natural gas, thereby causing misfire and, as a result, higher hydrocarbon and CO exhaust emissions. During power demand or notch transients (e.g., changes in notch level), engine speed and engine power change simultaneously. Therefore, efficient combustion of fuel is required to avoid misfire and knock. Since fueling may be adjusted quickly in response to a change in notch level and airflow takes a longer time to response, both fueling and airflow adjustments are necessary to adjust the air-fuel ratio to a desired level that reduces a likelihood of engine knock and misfire. Further, while method 700 presents a method utilized in a dual fuel engine combusting a combination of diesel fuel and natural gas, similar methods may be applied to single fuel diesel or gas engines. While the example of a changing notch level is described below with reference to method 700, in engines that are not included within a locomotive, changes in engine power demand may be considered instead of notch level. Thus, in these engine systems, instead of notch level as discussed below, engine actuator adjustments to adjust the air-fuel ratio may be made responsive to changes in engine power demand.

Method 700 begins at 702 by estimating and/or measuring engine operating conditions. Engine operating conditions may include engine load (e.g., notch level), engine speed, ambient temperature, ambient pressure, MAP, boost, a position of the engine bypass valve, a position of a compressor recirculation valve (CRV), a position of a wastegate, wheel slip conditions (e.g., from a wheel spin detector), or the like. At 704, the method includes determining if wheel slip is indicated. Wheel slip may be indicated from a wheel spin detector (e.g., such as the wheel spin detector 21 shown in FIG. 1). If the controller receives a signal indicating wheel slip conditions, the method continues to 706 to stop natural gas flow and reduce diesel flow to engine cylinders (e.g., to at least one engine cylinder of the engine). As one example, reducing diesel flow may include reducing the quantity of diesel to the engine cylinders to a notch-1 diesel fueling level. The method at 706 may further include advancing diesel injection timing. Method 706 further includes opening one or more of the engine bypass valve, CRV, and wastegate and/or reducing turbocharger speed with an e-turbo (if available on the engine) in order to reduce airflow to the engine cylinders. For example, opening the engine bypass valve may reduce airflow to the engine more quickly than traditional airflow adjustments while also reducing turbo lag. The method at 706 further includes transferring the excess engine load to one or more resistive grids of the vehicle (e.g., such as grids 19 shown in FIG. 1). In this way, the load on the engine may be reduced responsive to wheel slip while adjusting the air-fuel ratio combusted by the engine cylinders via fuel and airflow adjustments to a level that may reduce the likelihood of engine misfire.

Returning to 704, if wheel slip is not indicated, the method continues to 708 to determine if there is an increase in engine load, such as an increase in a notch level. If an increase in notch level is detected, the method continues to 714 to close the engine bypass valve, CRV, and/or wastegate. As a result, airflow to the engine cylinders may be increased. The method then continues to 716 to determine if a variable geometry turbine (VGT) or e-turbo is available (e.g., does the engine include a variable geometry turbine or e-turbo). If one or more of the elements at 716 is available, the method continues to 718 to increase both the natural gas and diesel flow to the engine cylinders, while maintaining the substitution ratio. The air-fuel ratio is then adjusted into the desired level through fuel flow control by sensing the airflow to the engine cylinders or by determining the airflow from a compressor map based on sensed turbo speed, compressor pressure ratio, and compressor inlet temperature and pressure. For example, the change in the notch level may be the changed operating condition that resulted in the change in the desired air-fuel ratio (as described above with reference to FIG. 4). As an example, during the notch increase, the fueling flow (e.g., quantity of fuel flowing to the engine cylinders) may increase based on the increase in engine load. However, the desired air-fuel ratio may increase from the previous level (e.g., before the notch increase) in order to avoid engine knock. At 718, the method may further include accelerating the turbocharger with the e-turbo or VGT in order to reduce turbo lag. The method continues on to 720 to open the bypass (e.g., by opening the bypass valve disposed in the bypass passage) around the pre-turbo DOC and/or post-turbo DOC. This may result in increased engine acceleration. If at 716, the controller determines an e-turbo or VGT is not available, the method instead continues to 722 to stop the flow of natural gas to the engine cylinders, increase diesel flow to the engine cylinders, and advance diesel injection timing. In an alternate example at 722, the method may include only reducing the flow of natural gas and also increasing diesel flow to the engine cylinders, while also optionally advancing diesel injection timing. The controller may increase diesel flow by an amount that delivers the desired air-fuel ratio (e.g., the desired air-fuel ratio based on the increased notch level and knock/misfire window, as described above). The method then continues from 722 to 720, as described above.

Returning to 708, if the controller does not detect an increase in notch, the method continues to 710 to determine if there is a decrease in notch level. If there is not a decrease in notch level, the method continues to 712 to maintain current fuel flow to the engine cylinders and a current position of the engine bypass valve. As such, the air-fuel ratio may be maintained at the current level. Otherwise, if a decrease in notch is detected, the method continues to 724 to close the bypass around the pre-turbo DOC and/or the post-turbo DOC. The method then continues on to 726 to determine if a VGT or c-turbo is available. If one or both of the VGT or c-turbo are available, the method continues to 728 to reduce both the natural gas flow and diesel flow to the engine cylinders in order to deliver the desired air-fuel ratio. As an example, during the notch decrease, the fueling may decrease based on the reduction in engine load. However, the desired air-fuel ratio may decrease from the previous level (e.g., before the notch decrease) in order to avoid engine misfire. Further, during the reducing natural gas and diesel flow to deliver the desired air-fuel ratio, the controller may also maintain the substitution ratio. The method at 728 may further include retarding the turbocharger using the c-turbo or VGT. The method continues to 730 to open the engine bypass valve, CRV, and/or wastegate in order to quickly reduce airflow, while the fuel flow is being reduced by the controller. Alternatively at 726, if an e-turbo or VGT is not available, the method continues to 732 to stop (e.g., reduce to zero flow) the natural gas flow, advance diesel injection timing, and reduce the diesel flow to a level that delivers the desired air-fuel ratio. The method then continues to 730, as described above.

FIG. 8 shows example engine actuator adjustments for adjusting an air-fuel ratio for combustion by the engine to a determined level during different operating conditions. Specifically, graph 800 shows changes in an engine notch level at 802, changes in an actual air-fuel ratio (e.g., the current air-fuel ratio being combusted by engine cylinders) at 804, a desired air-fuel ratio (to be combusted by the engine cylinders) at 806, engine speed at 808, natural gas flow to the engine cylinders at 810, diesel fuel flow to the engine cylinders at 812, a position of an engine bypass valve at 814, and airflow (e.g., an amount of airflow) into the engine cylinders at 816. As explained herein, the engine bypass valve (such as the engine bypass valve 232) is positioned in a bypass passage, the bypass passage coupled to an intake passage of the engine upstream of the engine cylinders and downstream of a turbocharger compressor of the engine. Graph 800 shows three different examples of conditions where the desired air-fuel ratio is changed due to a changed operating condition. As explained above, additional changed operating conditions resulting in the changed desired air-fuel ratio are possible and different combinations of engine actuator adjustments to deliver the changed desired air-fuel ratio to engine cylinders are possible.

Prior to time t1, the engine bypass valve (EBV) is closed, engine load is relatively constant (e.g., notch level is not changing), and the desired air-fuel ratio is not changing. At time t1, the desired air fuel ratio increases (plot 806). The change in the desired air-fuel ratio at time t1 may be due to a changed operating condition, such as an indication of knock, a change in a measured exhaust air-fuel ratio, or a change in intake air pressure or temperature. At time t1, the engine notch level is maintained (e.g., not changing). Thus, in response to the increase in the desired air-fuel ratio while the engine power level is maintained, the controller adjusts the speed of the engine. Specifically, the controller increases engine speed, thereby increasing airflow to the engine cylinder (as seen at plot 816). The controller increases the engine speed by an amount that delivers the desired air-fuel ratio to the engine cylinders (as shown at plot 806). Fuel flow to the engine is maintained between time t1 and time t2.

At time t2, there is a decrease in the engine notch level (plot 802), thereby decreasing engine power and engine speed (plot 808). As a result of the decrease in notch level, the controller decreases fueling to the engine cylinders (plots 810 and 812) while maintaining the substitution ratio and opens the EBV (plot 814). The initial decrease in fueling results in an increase in the actual air-fuel ratio (plot 804). The desired air-fuel ratio decreases to avoid engine knock (plot 806). The controller then continues to adjust fueling until the desired air-fuel ratio is reached (e.g., the actual air-fuel ratio at plot 804 is substantially the same as the desired at fuel ratio at plot 806). Thus, at time t2, graph 800 shows an example of adjusting fuel flow to engine cylinders of the engine in response to the change in the desired air-fuel ratio due to the decrease in notch level.

At time t3, there is an increase in notch level (plot 802), thereby increase engine power and engine speed (plot 808). As a result of the increase in notch level, the controller increases fueling to the engine cylinders (plots 810 and 812) which results in an increase in the actual air-fuel ratio (plot 804). In order to avoid misfire, the controller increases the desired air-fuel ratio. The change in the desired air-fuel ratio after time t3 may be less than a threshold amount of change. As such, the controller may close the EBV in order to increase airflow to the engine cylinders and deliver the desired air-fuel ratio while maintaining the fuel flow (for torque demand) and engine speed. Thus, at time t3, graph 800 shows an example of adjusting the EBV in response to the change in the desired air-fuel ratio below a threshold amount of change due to the increase in notch level.

In this way, an engine controller may control an air-fuel ratio delivered to engine cylinders for combustion by adjusting one or more of engine speed, fuel flow to the engine cylinders, or a position of an engine bypass valve configured to divert airflow away from the engine cylinders. The engine speed and engine bypass valve adjustments adjust an amount of airflow delivered to the engine cylinders while the fuel flow adjustments adjust the amount of fuel delivered to the engine cylinders. Engine fueling adjustments may allow for faster and larger changes in the delivered air-fuel ratio while airflow adjustments may result in slower and smaller changes in the delivered air-fuel ratio. Further, adjusting the engine bypass valve may allow for a change in the delivered airflow without resulting in a change in turbocharger speed and thus turbo lag. Additionally, the desired air-fuel ratio may be based on engine knock and engine misfire thresholds. Thus, during a change in an engine operating condition, the determined desired air-fuel ratio may be based on the current air-fuel ratio, current operating conditions, and knock and misfire thresholds for the current operating conditions. Further, the controller may adjust a combination of the engine speed, engine bypass valve, and fueling based on the changed operating condition that resulting in the change in the desired air-fuel ratio. As a result, the desired air-fuel ratio may be obtained more quickly and efficiently. In this way, a technical effect of responding to a sensed change in a load on the engine, or indications of engine knock or misfire, by one or more of adjusting engine speed, fuel flow to the engine cylinders, or a position of an engine bypass valve to adjust the air-fuel ratio to a desired level is to reduce the likelihood of engine knock and misfire during transient conditions, as well as reducing exhaust emissions and increasing an efficiency of the engine.

In one embodiment, a method for an engine comprises responding to a sensed change in a load on the engine, or indications of engine knock or misfire, by one or more of: altering a speed of the engine, adjusting a fueling flow rate into at least one cylinder of the engine, and adjusting a position of a valve in a bypass passage configured to direct compressed intake air away from cylinders of the engine to obtain a determined air-fuel ratio; and thereby maintaining an air-fuel ratio in a determined range. As one example, the determined air-fuel ratio is based on the sensed change in load or indication of engine knock or misfire and additional engine operating conditions including one or more of a measured oxygen or other gaseous emission level in an exhaust passage of the engine, a substitution ratio of natural gas to diesel fuel injected into the engine, an intake manifold pressure, a calculated or measured cylinder pressure, an exhaust temperature, or the speed of the engine.

Altering the speed of the engine may include increasing the speed of the engine to increase airflow to at least one cylinder of the engine in response to the determined air-fuel ratio being greater than a current air-fuel ratio during the sensed change in load or indications of engine knock and decreasing the speed of the engine to decrease airflow to at least one cylinder in response to the determined air-fuel ratio being less than the current air-fuel ratio. Adjusting fueling flow rate may include increasing a flow of one or more fuels to the at least one cylinder in response to the determined air-fuel ratio being less than a current air-fuel ratio during the sensed change in load or indications of engine knock or misfire and decreasing the flow of one or more fuels to the at least one cylinder in response to the determined air-fuel ratio being greater than the current air-fuel ratio. As one example, the engine is a dual fuel engine combusting natural gas and diesel fuel and adjusting the fueling flow rate includes increasing or decreasing the flow of one or more of the natural gas and diesel fuel while maintaining a substitution ratio of the natural gas to diesel fuel.

Additionally, the bypass passage may be coupled to an intake passage of the engine upstream of engine cylinders and downstream of a compressor and adjusting the position of the valve includes opening the valve to dump compressor intake air prior to it entering the engine cylinders in response to the determined air-fuel ratio being less than a current air-fuel ratio during the sensed change in load or indications of engine knock or misfire and closing the valve to direct intake air to the engine cylinders in response to the determined air-fuel ratio being greater than the current air-fuel ratio. In another example, the method comprises in response to a wheel slip condition indicated by a wheel spin detector of a vehicle in which the engine is installed, adjusting the fueling flow rate into the at least one cylinder, adjusting the position of the valve, adjusting injection timing of one or more fuels injected into the at least one cylinder, and transferring the load on the engine to one or more resistive grids of the vehicle. In another example, the indications of engine knock or misfire are determined based on one or more of an output of a knock sensor, an output of a misfire sensor, or an inferred or expected knock or misfire event based on engine operating conditions and wherein the sensed change in a load on the engine is a change in notch level.

As another embodiment, a method for an engine comprises responding to at least one of a sensed change in a load on the engine, or indications of at least one of engine knock or misfire, by one or more of: altering a speed of the engine, adjusting a fueling flow rate into at least one first cylinder of the engine, or adjusting a position of a valve in a bypass passage configured to direct compressed intake air away from cylinders of the engine to obtain a determined air-fuel ratio within a determined range. In another embodiment, the method may include responding to at least one of a sensed change in a load on the engine, or indications of at least one of engine knock or misfire, by at least two of: altering a speed of the engine, adjusting a fueling flow rate into at least one first cylinder of the engine, or adjusting a position of a valve in a bypass passage configured to direct compressed intake air away from cylinders of the engine to obtain a determined air-fuel ratio within a determined range. In yet another embodiment, the method may include responding to at least one of a sensed change in a load on the engine, or indications of at least one of engine knock or misfire, by each of: altering a speed of the engine, adjusting a fueling flow rate into at least one first cylinder of the engine, or adjusting a position of a valve in a bypass passage configured to direct compressed intake air away from cylinders of the engine to obtain a determined air-fuel ratio within a determined range.

In another embodiment, a method for an engine comprises responsive to a change in a desired air-fuel ratio, adjusting an air-fuel ratio of the engine to a determined level by: during a first condition, adjusting a speed of the engine; during a second condition, adjusting fuel flow to engine cylinders of the engine; and during a third condition, adjusting an engine bypass valve adapted to divert intake air away from the engine cylinders to a location external to the engine. The first condition may include one or more of an indication of knock or misfire, poor combustion efficiency or increased emissions, or a change in an engine operating condition that results in the change in the desired air-fuel ratio while a power level of the engine is maintained. The second condition may include one or more of a wheel slip condition or a change in a demanded power output of the engine that results in the change in the desired air-fuel ratio being above a threshold amount of change. The third condition may include one or more of a wheel slip condition or a change in a demanded power output of the engine that results in the change in the desired air-fuel ratio being below a threshold amount of change.

The method may further comprise during a fourth condition when the change in the desired air-fuel ratio is greater than a threshold or when knock or misfire are occurring, adjusting each of the fuel flow to the engine and the engine bypass valve to adjust the air-fuel ratio to the determined level in response to the change in the desired air-fuel ratio. Additionally or alternatively, the method may comprise during a fifth condition when the change in the desired air-fuel ratio is greater than the threshold and the engine bypass valve cannot be adjusted, adjusting each of the fuel flow to the engine and the speed of the engine to adjust the air-fuel ratio to the determined level in response to the change in the desired air-fuel ratio. Further still, the method may additionally or alternatively comprise during a sixth condition when the change in the desired air-fuel ratio is less than the threshold, adjusting each of the speed of the engine and the engine bypass valve to adjust the air-fuel ratio to the determined level in response to the change in the desired air-fuel ratio. In yet another example, the method further comprise, during a seventh condition when the change in the desired air-fuel ratio is greater than a threshold and knock or misfire are expected based on the change in the desired air-fuel ratio, adjusting each of the fuel flow to the engine, the speed of the engine, and the engine bypass valve to adjust the air-fuel ratio to the determined level in response to the change in the desired air-fuel ratio. In one example, the engine bypass valve is positioned in a bypass passage, the bypass passage coupled to an intake passage of the engine upstream of the engine cylinders and downstream of a turbocharger compressor of the engine.

In yet another embodiment, a system for an engine comprises a first intake air duct coupled to a first engine cylinder bank; a turbocharger including a compressor at least partially driven by a turbine, where the first intake air duct is coupled to an outlet of the compressor; a bypass passage coupled to the first intake air duct, upstream of the first engine cylinder bank, the bypass passage including an engine bypass valve configured to divert airflow from the first intake air duct to a location external to the engine; and a controller with computer readable instructions stored thereon for: adjusting one or more of a fuel flow of one or more fuels to cylinders of the first engine cylinder bank, a speed of the engine, and a position of the engine bypass valve in order to deliver a determined air-fuel ratio to the cylinders in response to one or more of a sensed change in load, an indication of knock, or an indication of misfire. The system may further comprise a second intake air duct coupled to a second engine cylinder bank, where the bypass passage is coupled to each of and between the first intake air duct and the second intake air duct, and where the engine bypass valve is configured to divert airflow from each of the first intake air duct and the second intake air duct, upstream of respective first and second engine cylinder banks, to the location external to the engine. In another example, the system further comprises an exhaust passage including the turbine, a first oxidation catalyst disposed upstream of the turbine and including a first bypass valve arranged in a first bypass around the first oxidation catalyst, and a second oxidation catalyst disposed downstream of the turbine and including a second bypass valve arranged in a second bypass around the second oxidation catalyst. Additionally, the controller may further include computer readable instructions for adjusting one or more of the first bypass valve and the second bypass valve in response to the sensed change in load.

In another example, the system further comprises a first intercooler disposed in the first intake air duct, upstream of the bypass passage and a second intercooler disposed in the second intake air duct, upstream of the bypass passage, where the turbocharger is a single turbocharger including a single compressor inlet and two compressor outlets, where each of the two compressor outlets are coupled to one of the first and second intake air ducts, and where the system does not include exhaust gas recirculation. The system may further comprise a wheel spin detector configured to detect a wheel slip condition of a vehicle in which the engine is installed and the controller may further include computer readable instructions for reducing fuel flow of one or more fuels to cylinders of the first engine cylinder bank and opening the engine bypass valve to divert airflow from the first intake air duct to a location external to the engine.

In another representation, a method comprises: responsive to a change in a desired air-fuel ratio, adjusting an air-fuel ratio of an engine to a determined level by: during a first condition, adjusting fuel flow to an engine cylinder; during a second condition, adjusting airflow to the engine cylinder, and during a third condition, adjusting both fuel flow and airflow to the engine cylinder.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third." etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an engine, comprising:
responding to a sensed change in a load on the engine, or indications of engine knock or misfire, by:
operating in a first mode and, in the first mode, altering a speed of the engine to obtain a determined air-fuel ratio within a determined range; and
operating in a second mode and, in the second mode, adjusting a position of a valve in a bypass passage configured to direct compressed intake air away from cylinders of the engine to obtain the determined air-fuel ratio within the determined range.

2. The method of claim 1, wherein the determined air-fuel ratio is based on the sensed change in load or indications of engine knock or misfire and additional engine operating conditions including one or more of a measured oxygen or other gaseous emission level in an exhaust passage of the engine, a substitution ratio of natural gas to diesel fuel injected into the engine, an intake manifold pressure, a calculated or measured cylinder pressure, an exhaust temperature, or the speed of the engine.

3. The method of claim 1, wherein altering the speed of the engine includes:
increasing the speed of the engine to increase airflow to at least one cylinder of the engine in response to the determined air-fuel ratio being greater than a current air-fuel ratio during the sensed change in load or indications of engine knock or misfire; and
decreasing the speed of the engine to decrease airflow to the at least one cylinder in response to the determined air-fuel ratio being less than the current air-fuel ratio.

4. The method of claim 1, further comprising operating in a third mode and, in the third mode, adjusting a fueling flow rate into at least one cylinder of the engine, wherein adjusting the fueling flow rate includes:
increasing a flow of one or more fuels to the at least one cylinder in response to the determined air-fuel ratio being less than a current air-fuel ratio during the sensed change in load or indications of engine knock or misfire; and
decreasing the flow of the one or more fuels to the at least one cylinder in response to the determined air-fuel ratio being greater than the current air-fuel ratio.

5. The method of claim 4, wherein the engine is a dual fuel engine combusting natural gas and diesel fuel and wherein adjusting the fueling flow rate includes increasing or decreasing the flow of the natural gas and increasing or decreasing the flow of the diesel fuel while maintaining a substitution ratio of the natural gas to diesel fuel.

6. The method of claim 1, wherein the bypass passage is coupled to an intake passage of the engine upstream of engine cylinders and downstream of a turbocharger compressor and wherein adjusting the position of the valve includes:
opening the valve to dump compressor intake air prior to it entering the engine cylinders in response to the determined air-fuel ratio being less than a current air-fuel ratio during the sensed change in load or indications of engine knock or misfire; and
closing the valve to direct intake air to the engine cylinders in response to the determined air-fuel ratio being greater than the current air-fuel ratio.

7. The method of claim 1, further comprising, in response to a wheel slip condition indicated by a wheel spin detector of a vehicle in which the engine is installed, operating in a fourth mode and in the fourth mode, adjusting a fueling flow rate into at least one cylinder of the engine, adjusting the position of the valve, adjusting injection timing of one or more fuels injected into the at least one cylinder, and transferring the load on the engine to one or more resistive grids of the vehicle or to an energy storage device.

8. The method of claim 1, wherein the indications of engine knock or misfire are determined based on one or more of an output of a knock sensor, an output of a misfire sensor, or an inferred or expected knock or misfire event based on engine operating conditions and wherein the sensed change in the load on the engine is a change in notch level.

9. A method for an engine, comprising:
responsive to a change in a desired air-fuel ratio, adjusting an air-fuel ratio of the engine, where the engine is a dual fuel engine combusting diesel fuel and natural gas, to a determined level by:
during a first condition, adjusting a speed of the engine;
during a second condition, adjusting fuel flow of one or more of the diesel fuel and the natural gas to engine cylinders of the engine; and during a third condition, adjusting an engine bypass valve adapted to divert intake air away from the engine cylinders to a location external to the engine.

10. The method of claim 9, wherein the first condition includes one or more of an indication of knock or misfire, decreased combustion efficiency or increased emissions, or a change in an engine operating condition that results in the change in the desired air-fuel ratio while a power level of the engine is maintained.

11. The method of claim 9, wherein the second condition includes one or more of a wheel slip condition or a change in a demanded power output of the engine that results in the change in the desired air-fuel ratio being above a threshold amount of change.

12. The method of claim 9, wherein the third condition includes one or more of a wheel slip condition or a change in a demanded power output of the engine that results in the change in the desired air-fuel ratio being below a threshold amount of change.

13. The method of claim 9, further comprising:
during a fourth condition when the change in the desired air-fuel ratio is greater than a threshold or when knock or misfire are occurring, adjusting each of the fuel flow to the engine cylinders and the engine bypass valve to adjust the air-fuel ratio to the determined level in response to the change in the desired air-fuel ratio;
during a fifth condition when the change in the desired air-fuel ratio is greater than the threshold and the engine bypass valve cannot be adjusted due to the engine bypass valve already being in a desired position for obtaining the desired air-fuel ratio, adjusting each of the fuel flow to the engine cylinders and the speed of the engine to adjust the air-fuel ratio to the determined level in response to the change in the desired air-fuel ratio; and
during a sixth condition when the change in the desired air-fuel ratio is less than the threshold, adjusting each of the speed of the engine and the engine bypass valve to adjust the air-fuel ratio to the determined level in response to the change in the desired air-fuel ratio.

14. The method of claim 9, further comprising, during a seventh condition when the change in the desired air-fuel ratio is greater than a threshold and knock or misfire are expected based on the change in the desired air-fuel ratio, adjusting each of the fuel flow to the engine cylinders, the speed of the engine, and the engine bypass valve to adjust the air-fuel ratio to the determined level in response to the change in the desired air-fuel ratio.

15. The method of claim 9, wherein the engine bypass valve is positioned in a bypass passage, the bypass passage coupled to an intake passage of the engine upstream of the engine cylinders and downstream of a turbocharger compressor of the engine.

16. A system for an engine, comprising:
a first intake air duct coupled to a first engine cylinder bank;
a turbocharger including a compressor at least partially driven by a turbine, where the first intake air duct is coupled to an outlet of the compressor;
a bypass passage coupled to the first intake air duct, upstream of the first engine cylinder bank, the bypass passage including an engine bypass valve configured to divert airflow from the first intake air duct to a location external to the engine; and
a controller with computer readable instructions stored thereon for:
adjusting a position of the engine bypass valve in order to deliver a determined air-fuel ratio to engine cylinders in response to one or more of a sensed change in load, an indication of knock, or an indication of misfire.

17. The system of claim 16, further comprising a second intake air duct coupled to a second engine cylinder bank, wherein the bypass passage is coupled to each of and between the first intake air duct and the second intake air duct, and wherein the engine bypass valve is configured to divert airflow from each of the first intake air duct and the second intake air duct, upstream of the first and second engine cylinder banks respectively, to the location external to the engine.

18. The system of claim 16, further comprising an exhaust passage including the turbine, a first oxidation catalyst disposed upstream of the turbine and including a first bypass valve arranged in a first bypass around the first oxidation catalyst, and a second oxidation catalyst disposed downstream of the turbine and including a second bypass valve arranged in a second bypass around the second oxidation catalyst, and wherein the controller further includes computer readable instructions for adjusting one or more of the first bypass valve and the second bypass valve in response to the sensed change in load.

19. The system of claim 16, wherein the engine is a dual fuel engine combusting diesel fuel and the natural gas, wherein the computer readable instructions further include instructions for adjusting one or more of a fuel flow of one or more of the diesel fuel and natural gas to cylinders of the first engine cylinder bank and a speed of the engine in order to deliver the determined air-fuel ratio to the cylinders in response to one or more of the sensed change in load, the indication of knock, or the indication of misfire, and further comprising a first intercooler disposed in the first intake air duct, upstream of the bypass passage and a second intercooler disposed in the second intake air duct, upstream of the bypass passage, wherein the turbocharger is a single turbocharger including a single compressor inlet and two compressor outlets, wherein each of the two compressor outlets is coupled to one of the first and second intake air ducts, and wherein the system does not include exhaust gas recirculation.

20. The system of claim 16, wherein the engine is a dual fuel engine combusting diesel fuel and natural gas and further comprising a wheel spin detector configured to detect a wheel slip condition of a vehicle in which the engine is installed and wherein the controller further includes computer readable instructions for stopping natural gas flow and reducing diesel flow to cylinders of the first engine cylinder bank and opening the engine bypass valve to divert airflow from the first intake air duct to the location external to the engine.

* * * * *